US012650770B1

(12) United States Patent
    Patel et al.

(10) Patent No.: US 12,650,770 B1
(45) Date of Patent: Jun. 9, 2026

(54) OPTIMIZING LATENCY OF READ TRANSACTIONS WITH METADATA UPDATE IN MEMORY EXPANSION DEVICES

(71) Applicant: Astera Labs, Inc., Santa Clara, CA (US)

(72) Inventors: Nirav Ishwarbhai Patel, Fremont, CA (US); Anh Thien Tran, Elk Grove, CA (US)

(73) Assignee: Astera Labs, Inc., Santa Clara, CA (US)

( * ) Notice: Subject to any disclaimer, the term of this patent is extended or adjusted under 35 U.S.C. 154(b) by 548 days.

(21) Appl. No.: 18/072,611

(22) Filed: Nov. 30, 2022

(51) Int. Cl.
    *G06F 3/06* (2006.01)
(52) U.S. Cl.
    CPC .......... *G06F 3/0613* (2013.01); *G06F 3/0656* (2013.01); *G06F 3/0659* (2013.01); *G06F 3/0673* (2013.01)
(58) Field of Classification Search
    None
    See application file for complete search history.

(56) References Cited

U.S. PATENT DOCUMENTS

2022/0263913 A1*  8/2022  Zhang ................... G06F 3/0604
2023/0009642 A1*  1/2023  Eilert ................... G06F 3/0619

* cited by examiner

*Primary Examiner* — Michael Alsip
(74) *Attorney, Agent, or Firm* — Shield Intellectual Property PC; Zhichong Gu

(57) ABSTRACT

A memory read response is received from a memory controller in response to a memory request and includes specific data and specific metadata attendant to the specific data retrieved with specific memory addresses in the device memory. The specific data and specific metadata are sent to a host device in a host-bound memory read response. In response to determining that a metadata update condition is satisfied, a number of actions are performed as follows. Specific modified metadata attendant to the specific data is determined. A MEMC-bound memory write request for metadata update is generated. The MEMC-bound memory write request is used to write the specific modified metadata attendant to the specific data in the device memory. The specific data and the specific modified metadata are stored in an entry of a temporary write buffer until the entry is invalidated by the corresponding metadata update write acknowledgement returned from the MEMC.

21 Claims, 13 Drawing Sheets

100

402

Pop a RD Req from
the RD Req Fifo

404

TWB lookup using
RD Req address is hit?

*No*

408

Send RD Req to MEMC

*Yes*

406

Get the TWB Hit Result and
send to the RD Resp Arbiter receive a memory read response from a memory controller link 482 send the specific data and specific metadata in a host-bound memory read response 484 determine specific modified metadata attendant to the specific data 486 generate a memory write request for metadata update 488 store the specific data and the specific modified metadata in a buffer 490

OPTIMIZING LATENCY OF READ TRANSACTIONS WITH METADATA UPDATE IN MEMORY EXPANSION DEVICES

TECHNICAL FIELD

Embodiments relate generally to computing systems, and, more specifically, to techniques for optimizing latency of read transactions with metadata update in memory expansion devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The explosion of data and mainstreaming of specialized workloads—like artificial intelligence (AI) and machine learning (ML)—have given rise to heterogeneous computing in which graphics processing units (GPUs) and/or AI processors and/or other expanders or accelerators such as memory expanders/accelerators work side-by-side with host computing devices such as (e.g., general-purpose, etc.) central processing units or CPUs. Peripheral Component Interconnect Express (PCIe) and/or Compute Express Link (CXL) connectivity solutions can be built to enable relatively simple or complex topologies of various devices, memories, processors, servers, etc., to expand memory and accelerate workloads in a flexible, responsive and efficient way, while at the same time improving availability, bandwidth and performance.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
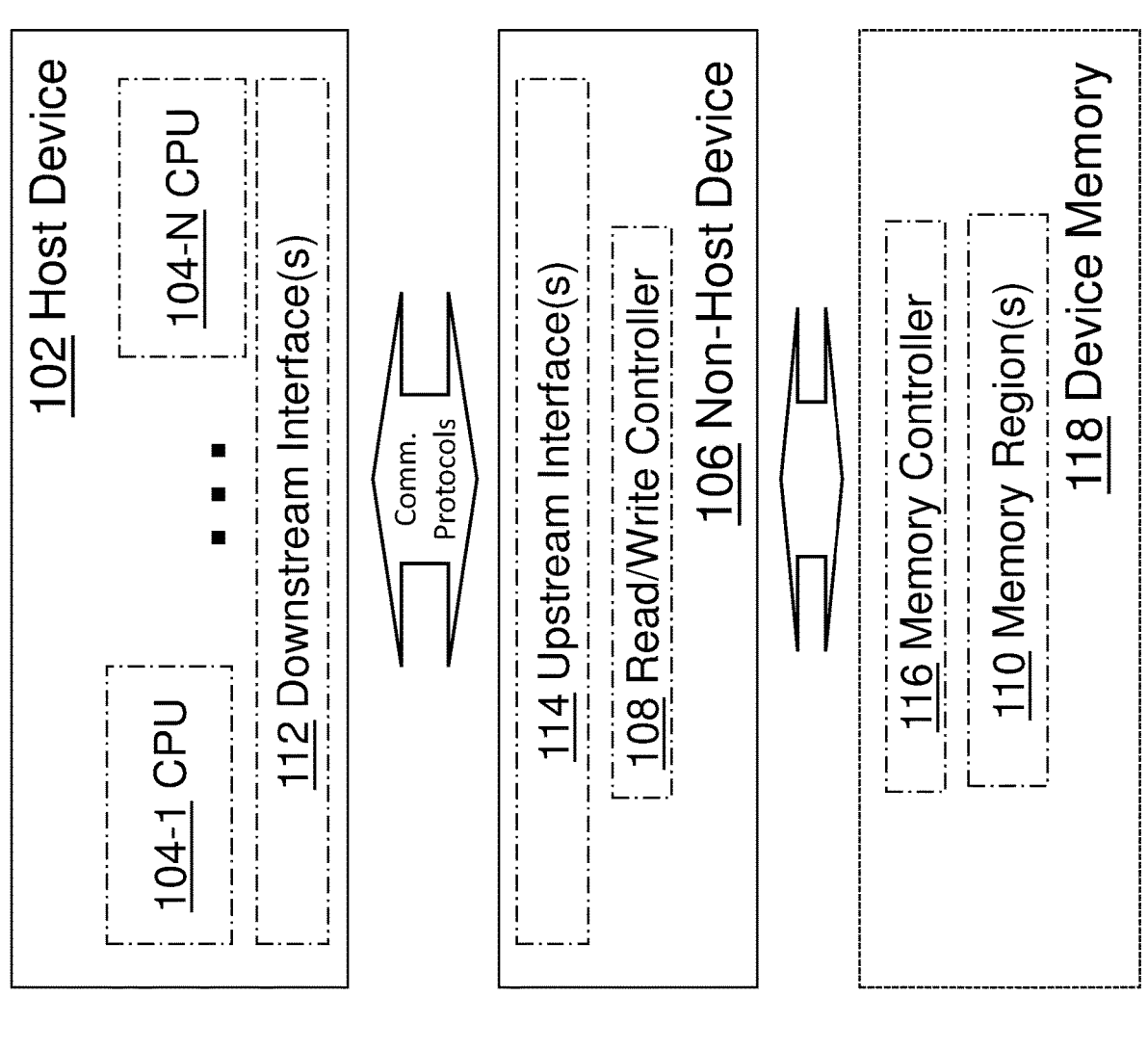
FIG. 1 illustrates an example heterogeneous computing system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
    2.1. Host Computing Device
    2.2. CPUs in the Host
    2.3. Downstream Interfaces
    2.4. Non-Host Computing Device
    2.5. Upstream Interfaces
    2.6. Read/Write Controller
    2.7. Device Memory
    2.8. Memory Regions
    2.9. Latency Optimization Framework
    2.10. Miscellaneous
3.0. Functional Overview
    3.1. Read Operations with Metadata Update
    3.2. Data Coherency
    3.3. Conservative Design
    3.4. Optimized Design
    3.5. Successive Metadata Updates
    3.6. Example Process Flows
4.0. Implementation Mechanism-Hardware Overview
5.0. Extensions and Alternatives

1.0. General Overview

In a heterogeneous computing system, memory write commands may be used by a host device to write both data and metadata (attendant to the data) into a memory media device by way of a non-host device to which the memory media device is attached, while memory read commands may be used by the host device to read both the data and metadata from the memory media by way of the non-host device.

Recently, some new memory read commands are defined, for example in the Compute Express Link (CXL) standard, in which they may be used to not only read data and metadata from the memory media but also cause metadata update when one or more metadata update conditions are met. Hence, the metadata after being modified may be written back to the memory media even though these memory commands are read commands.

In addition, the host device is allowed to send, to the non-host device, another memory read request to the same address as specified in a previous memory read request so long as a memory read response to the previous memory read request has been received by the host device. Because the previous memory read request made a metadata update that was being written to the memory media but that write operation may not yet completed yet, the new memory read request may get the old metadata value. That would cause serious data coherence mismatch issue at the host device.

To avoid that data coherence mismatch issue, conservative designs for supporting memory read commands with metadata update may hold up memory read responses until those memory read commands with metadata are completed in the memory media device, thereby generating relatively significant latencies in processing those memory read commands.

In contrast, techniques as described herein can be used to entirely hide any latency of metadata update in connection with memory read commands and achieve the same round-trip latency for both memory read commands involving metadata updates and memory read commands not involving metadata updates. In addition, in the case in which the host device issues a new memory read command to the same address as a previous memory read command (or its previously received memory read response), the round-trip read latency can even be potentially smaller than a normal memory read command (e.g., not involving metadata update, etc.).

Under the techniques described herein, the non-host device can return a first memory read response to the host device immediately upon receiving corresponding read response or result from the device memory attached to the non-host device. As a result, the round-trip latency associated with the processing first memory read request end-to-end between the host device and the device memory is the same as a normal memory read operation not involving metadata update.

If a metadata update condition is satisfied, the non-host device can enqueue or initiate a memory write request for metadata update operations that write the modified (new) metadata to the device memory. The non-host device also caches, stores or buffers specific data retrieved from the device memory and the new or modified metadata attendant to the specific data—while the new or modified metadata is being written to the device memory—in an entry of a temporary write buffer (TWB). The entry in the TWB will be invalidated upon receiving a memory write response or acknowledgment from the device memory for the corresponding metadata update write operation.

If the host device issues a new or second memory read request to the same address as specified with the first memory read request or its memory read response before the entry in the TWB gets invalidated, the non-host device can immediately return the specific data and new metadata stored in the entry of the TWB to the host device. As a result, the round-trip latency can be much (e.g., three times, five times, etc.) smaller than a normal read (RD) operation under other approaches that do not implement the techniques as described herein.

The cache/buffer entry used to temporarily store the data and the new metadata at the non-host device may be invalidated in response to receiving a memory write response or acknowledgement from the device memory, which means that the new metadata (values) have already been written to the memory media or device memory. The non-host device thereafter can just read the memory media in response to receiving a subsequent memory read request from the host device, and returns a subsequent memory read response back to the host device in the same way as the first memory read response from the host device is handled or processed.

Hence, in all these operational scenarios, technique as described herein can be implemented to process host originated memory read requests with the same or smaller round-trip latency as compared with other approaches.

Approaches, techniques, and mechanisms support memory access transactions with respect to host-managed device memory. A memory read response is received from a memory controller (MEMC) of a device memory in response to a memory request previously sent to the memory controller. The memory read response from the memory controller includes specific data and specific metadata attendant to the specific data retrieved with one or more specific memory addresses in the device memory. The specific data and specific metadata are sent to a host device in a host-bound memory read response derived from the memory read response received from the memory controller. In response to determining that a metadata update condition is satisfied, a number of actions are performed as follows. Specific modified metadata attendant to the specific data is determined. A MEMC-bound memory write request for metadata update is generated. The MEMC-bound memory write request is used to write the specific modified metadata attendant to the specific data in the device memory. The specific data and the specific modified metadata are stored in an entry of a temporary write buffer until the entry is invalidated upon receiving the corresponding write acknowledge from the MEMC.

In other aspects, the inventive subject matter encompasses computer apparatuses and computer-readable media configured to carry out the foregoing techniques.

2.0. Structural Overview

FIG. 1 illustrates an example heterogeneous computing system (or device) 100 in an embodiment. Heterogeneous computing system 100 comprises a (e.g., CXL, non-CXL, etc.) host computing device 102, a (e.g., CXL, non-CXL, etc.) non-host computing device 106, a device memory (device) 118, and so on. Some or all of the processing components described herein are implemented in central processing units (CPUs), application-specific integrated circuits (ASICs), field programmable gate arrays (FPGAs), microcontrollers, graphics processing units (GPUs), base boards, mother boards, add-in cards, EDSFF cards, line cards in a chassis, or other integrated circuit(s). Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

In various operational scenarios, the heterogeneous computing system 100 may include more or fewer processing components than illustrated in FIG. 1. For example, the heterogeneous computing system 100 may include additional computing devices or processing components with which the host computing device 102, or some or all of the CPUs 104-1 through 104-N therein, operatively communicate through CXL or non-CXL interfaces and/or communication protocols.

2.1. Host Computing Device

As illustrated in FIG. 1, a host computing device 102 may include one or more CPUs 104-1 through 104-N, where N represents an integer no less than one (1). The host computing device 102 may further include one or more downstream interface(s)—or downstream port(s)—112; etc. In some operational scenarios, the host computing device 102 may be of a different computing device type as compared with non-host computing devices such as accelerators, memory expanders, CXL Type 3 devices, non-CXL-Type-3 devices, etc.

In various operational scenarios, the host computing device 102 may include more or fewer processing components than illustrated in FIG. 1 and may be communicatively linked with additional processing components in and out of the heterogeneous computing system 100. In some operational scenarios, the host computing device 102 may be attached to or may operatively communicate with locally attached memories (e.g., dual in-line memory modules or DIMMs, etc.). The locally attached memories can be pooled among CPUs (e.g., 104-1 through 104-N, etc.) or processor cores in the host computing device 102 using (e.g., CXL, non-CXL, etc.) communication protocols based memory pooling operations. Additionally, optionally or alternatively, the host computing device 102 may be attached to or may operatively communicate with some or all of: solid state drives (SSD) through Non-Volatile Memory Express (NVME) interfaces; just a bunch of GPUs (JBoG) through PCIe based communications links, riser cards, network interface cards (NICs), etc.; other host computing devices through non-transparent bridges; AI processors; just a bunch of flashes (JBoF) through memory expansion devices and/or cable extender cards with re-timers and/or transceivers; spine and/or leaf switches through NICs; etc.

2.2. CPUS in the Host

The host computing device 102 may include one or more CPUs (e.g., 104-1 through 104-N) each of which may represent a processor core that can be used to access, decode and/or execute instructions of an installed or running operating system (OS) or of various system and/or user computing processes running on top of or inside the OS. The processor core may communicate with other processing components and/or local memories and/or HDM (device attached) memories to carry out operations requested or represented in the instructions. System or user data generated, processed, used or outputted by the processor core during operation may be stored, buffered, cached, read, written, updated, etc., in the memories locally attached to the host computing device 102 and/or in the HDM memories— not locally attached to the host computing device 102 but rather-attached to another computing device such as a non-host device 106.

2.3. Downstream Interfaces

The host computing device 102 may include one or more downstream interfaces 112 used by a processor core such as a CPU in the host computing device 102 to carry out memory access transactions relating to data storing, buffering, caching, reading, updating, etc., with one or more non-host computing devices such as 106 of FIG. 1. Memory access requests may be generated, communicated or made by the processor core in these memory access transactions to the non-host devices via the one or more downstream interfaces 112 using communication protocols (e.g., over PCIe, etc.).

In return, the host computing device 102 or the processor core therein can receive—through the one or more downstream interfaces 112 using the communication protocols— memory access responses in these memory access transactions from the non-host devices. These responses are responsive to the memory access request made or issued by the host computing device 102. These memory access responses may carry first data field values to indicate whether memory access operations requested in the memory access requests have been completed by the non-host devices successfully or unsuccessfully (or failed). Additionally, optionally or alternatively, these memory access responses received by the host computing device 102 may carry second data field values to provide or return any requested data items. These data entries may be read from or stored, buffered or cached at memory entries in a device memory 118 attached to the non-host device 106.

2.4. Non-Host Computing Device

The non-host computing device 106 may represent a (e.g., CXL, non-CXL, etc.) accelerator, a (e.g., CXL, non-CXL, etc.) memory expander, CXL Type 3 devices, non-CXL-Type-3 devices, etc. As illustrated in FIG. 1, a non-host computing device 106 may include a (host-originated) read/write controller 108, which can be implemented with IC circuits such as ASICs or FPGAs (not shown) of the non-host computing device 106. The non-host computing device 106 may also include one or more (e.g., CXL, non-CXL, etc.) upstream interface(s)—or upstream port(s)—114 used to communicate with the host computing device 102.

In various operational scenarios, the non-host computing device 106 may include more or fewer processing components than illustrated in FIG. 1 and may be communicatively linked with additional processing components in and out of the heterogeneous computing system 100.

2.5. Upstream Interfaces

The non-host computing device 106 may include one or more upstream interfaces 114 used by a computing processor in the non-host computing device 102 to carry out memory access transactions relating to data storing, buffering, caching, reading, updating, etc., with one or more memory regions such as 110 of FIG. 1 in a device memory 118. Memory access requests may be received by the non-host computing device 106 as a part of these memory access transactions via the one or more upstream interfaces 114 using the communication protocols (e.g., over PCIe, etc.).

In response, the non-host computing device 106 may invoke the read/write controller 108 to translate host physical addresses into corresponding device physical addresses and/or access specific memory regions as well as specific memory entries as referenced or identified by the device physical addresses and/or error handling or logging if any of these translation or memory access operations encounters error or failure.

The non-host computing device 106 can generate and send-through the one or more upstream interfaces 114 using the communication protocols-memory access responses in these memory access transactions to the host computing device 102. These responses are responsive to the memory access request made or issued by the host computing device 102 and carry or include values for a number of data fields. These memory access responses may carry first data field values to indicate whether memory access operations requested in the memory access requests have been completed by the non-host computing device 106 successfully or unsuccessfully (or failed). Additionally, optionally or alternatively, these memory access responses sent by the non-host computing device 106 may carry second data field values to provide or return any requested data items in specific memory regions and specific memory entries therein as referenced by translated device physical addresses corresponding to some or all of the host physical addresses referenced in the host originated requests. These data entries may be read from or stored, buffered or cached at the specific memory regions and the specific memory entries therein as referenced by the translated device physical addresses corresponding to some or all of the host physical addresses.

2.6. Read/Write Controller

The non-host computing device 106 may include software (SW), hardware (HW), firmware, or a combination of one or more of the foregoing, that implements (memory) read/write controller 108.

During operation, for a memory access request received from the host computing device 102, the read/write controller 108 can be invoked by the non-host computing device 106 to provide a memory access response.

In some operational scenarios, the memory access response generated by the read/write controller 108 may include one or more data items (or fields) derived from a buffer entry or entries in (e.g., temporary write, etc.) buffer(s)—separate from the device memory 118 or memory regions 110 therein—maintained by the read/write controller 108.

In some operational scenarios, the memory access response generated by the read/write controller 108 may include one or more data items (or fields) derived from a memory entry or entries in the device memory 118 or memory regions 110 therein. For example, the read/write controller 108 may issue device memory read or write requests to the device memory 118—or a memory controller 116 therein—and receive device memory read or write responses from the device memory 118 or the memory controller 116. The device memory read or write responses as received from the device memory 118 or the memory controller 116 may be used by the read/write controller 108 to generate or produce the one or more data items to be included in the memory access response sent back by the non-host device 106 to the host device 102.

2.7. Device Memory

The device memory 118 may represent a memory device (e.g., locally, etc.) attached to the non-host device 106. As illustrated in FIG. 1, a device memory 118 may include a memory controller 116, which can be implemented with IC circuits such as ASICs or FPGAs (not shown).

The device memory 118 may further include or operate with, or may be attached with, one or more memory regions 110. The memory regions 110 may include some or all of the same types of memory regions. Additionally, optionally or alternatively, the memory regions 110 may include different types of memory components (e.g., dynamic random access memory or DRAM, PCRAM, MRAM, ReRAM, NAND, NOR, DIMMs, SSDs, flashes, non-volatile memory, volatile memory, etc.).

The device memory 118 may be used to support (relatively low level) memory read/write operations between the read/write controller 108 in the non-host device 106 and the memory controller 116 in the device memory 118. In some operational scenarios, the device memory 118 may be implemented as a part of the non-host device 106. In some other operational scenarios, the device memory 118 may be implemented separate from but operating in conjunction with the non-host device 106.

In various operational scenarios, the non-host computing device 106 may include more or fewer processing components than illustrated in FIG. 1 and may be communicatively linked with additional processing components in and out of the heterogeneous computing system 100.

2.8. Memory Regions

The device memory 118 may include or operate with, or may be attached with, one or more memory regions 110 that are host managed device (attached) memory under memory access or communication protocols including but not limited to the CXL .mem protocols. The memory regions 110 may have memory entries with different device physical addresses. A device physical memory may be used by the non-host computing device 106 or the read/write controller 108 therein to identify or reference a specific memory region as well as a specific memory entry in a set of memory entries in the memory region.

The memory regions 110 may be mapped to one or more host physical address ranges in the system coherent address space of the host computing device 102.

2.9. Latency Optimization Framework

Figure 2:
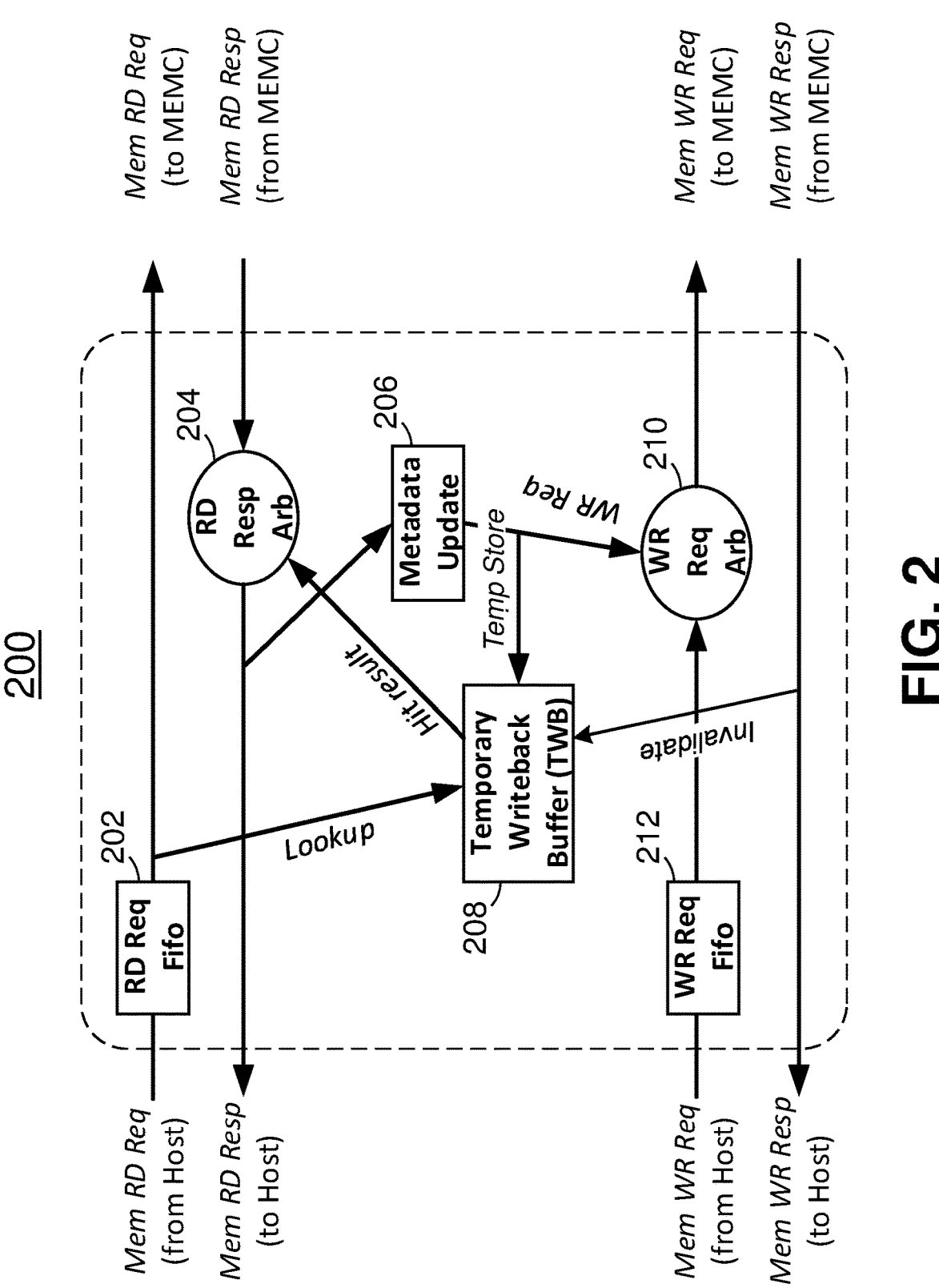
FIG. 2 illustrates an example framework.

FIG. 2 illustrates an example framework 200 for performing memory read/write operations with optimized or reduced latency. These read/write operations may include, but not necessarily limited to only, read transactions with metadata update. The framework 200 may be implemented as a part of the non-host device 106 or the read/write controller 108 therein.

As shown, a read request FIFO 202 (denoted as "RD Req Fifo") may be used to buffer memory read or read access requests (denoted as "Mem RD Req") received by the non-host device 106 from the host device 102, whereas a write request FIFO 212 (denoted as "WR Req Fifo") may be used to buffer memory write or write access requests (denoted as "Mem WR Req") received by the non-host device 106 from the host device 102. The requests may be buffered in these FIFOs before they are sent (e.g., via commands for relatively low memory read/write operations, etc.) to the memory controller 116 of the device memory 118 while the memory controller 116 is serving other commands corresponding to other read/write requests received or initiated by the read/write controller 108 of the non-host device 106.

A memory read request ("Mem RD Req") may be dequeued from the read request FIFO 202 ("RD Req Fifo") and sent to the memory controller 116 (also referred to as "MEMC") of the device memory 118, for example via a relatively low level memory read command corresponding to or representing the memory read request. In response to the memory read request or command, the memory controller 116 ("MEMC") may proceed to perform requested memory read operations with respect to one or more memory entries in a memory region 110 of the device memory 118 as referenced by the memory read request or command and send back a memory read response (denoted as "Mem RD Resp") to the read/write controller 108 of the non-host device 106 implementing the framework 200.

In response to receiving the memory read response from the memory controller 116, the read/write controller 108 or a read response arbiter 204 ("RD Resp Arb") therein sends a host-bound memory read response ("Mem RD Resp") to the host device 102. The host-bound memory read response includes data retrieved from the device memory 118 by the memory controller 116.

The non-host device 106 or a metadata update block/module 206 therein further checks or determines whether any (new metadata update) conditions, for example as defined in the CXL standard specification, for updating metadata—attendant to the data retrieved from the device memory 118 and returned to the memory controller 116—are satisfied.

In response to determining that at least one such (new metadata update) condition is satisfied or met, the read/write controller 108 or the metadata update block/module 206 of the framework 200 implemented therein generates or initiate a new metadata write operation to write new metadata—attendant to the data—to the device memory 118 by sending or enqueuing a new metadata write request (denoted as "WR Req") to a write request arbiter 210 (denoted as "WR Req Arb"). In the meantime, the metadata update block/module 206 stores (a copy of) the retrieved data and new metadata value (e.g., one or more new or updated metadata values for the date stored in the device memory 118, etc.) in a temporary writeback buffer (TWB) 208.

The TWB 208 may be configured or pre-configured with a (e.g., relatively large, etc.) total number of buffer entries to store or buffer a corresponding total number of data (items) from a corresponding total number of successive memory read responses ("Mem RD Resp") sent by the memory controller 116 of the device memory 118 to the read/write controller 108 of the non-host device 106 such that the total number of buffer entries is enough or sufficient to cover sending memory read responses by the read/write controller 108 of the non-host device 106 to the host device 102 during a (e.g., normal, normal plus a safety margin, etc.) time latency for the read/write controller 108 to receive a new metadata update acknowledgment (denoted as "WR Resp ACK") from the memory controller 116 of the device memory 118 in response to a new metadata update request or command sent by the read/write controller 108 to the memory controller 116. In other words, the TWB 208 may be configured or pre-configured with sufficient entries to minimize the flow control bubbles occurring on the new metadata update path.

As shown in FIG. 2, the read response arbiter 204 ("RD Resp Arb") may be used to select or determine whether a hit result from the TWB 208 of the non-host device 106 or a memory read response ("Mem RD Resp") from the memory controller 116 of the device memory 118 is to be used to return the retrieved data and metadata value attendant to the retrieved data to the host device 102 per clock cycle.

In addition, the write request arbiter 210 ("WR Req Arb") may be used to select or determine whether a memory write request ("Mem WR Req") from the host device 102 and dequeued from the memory write request FIFO 212 ("WR Req Fifo") from the host device 102 or a new metadata update ("WR Req") should be sent to the memory controller 116 ("MEMC") of the device memory 118 per clock cycle.

2.10. Miscellaneous

The foregoing figures illustrate only a few examples in which the techniques described herein may be practiced. Other embodiments may include fewer and/or additional components in varying arrangements.

3.0. FUNCTIONAL OVERVIEW

Memory write (denoted as "MemWr") commands may be used by a host device 102 to write both data and metadata (attendant to the data) into memory media, while memory read (denoted as "MemRd") commands may be used to read both the data and metadata from the memory media.

In some operational scenarios (e.g., as defined in an industry standard such as the CXL specification or standard, etc.), additional (or additional types of) memory read commands may be used to not only read data and metadata from the memory media but also update the metadata to a new metadata value and write the new (or updated) metadata back to the memory media if one or more new metadata update conditions are met or satisfied.

The memory media may be a part of a memory expansion (e.g., CXL Type-3, non-CXL, etc.) device used as device memory (e.g., 118 of FIG. 1, etc.) attached to a non-host device (e.g., 106 of FIG. 1, etc.). A host device (e.g., 102 of FIG. 1, etc.) may access (e.g., read, write, etc.) data stored in the device memory 118 by way of the non-host device 106.

The device memory 118 or a memory entry therein may store not only (e.g., 512-bit, etc.) data per memory write or write access request from the host device 102, but also (additional) metadata attendant to the data to be written. The metadata may be passed in the memory write request from the host device 102 or may be generated by the non-host device 106 based on presence or absence of data field values or attributes specified or not specified in the memory write request from the host device 102. Example metadata as described herein may be 2-bit metadata per 512-bit data as defined or specified in industry standards such as the CXL 1.1 and 2.0 specifications or in proprietary specifications to which the host device 102 and the non-host device 106 are to comply. Additionally, optionally or alternatively, example metadata as described herein may be 16-bit or 32-bit metadata per 512-bit data (depending on specific use cases) as defined or specified in industry standards such as the CXL 3.0 specification or in proprietary specifications to which the host device 102 and the non-host device 106 are to comply.

3.1. Read Operations with Metadata Update

Figure 3A:
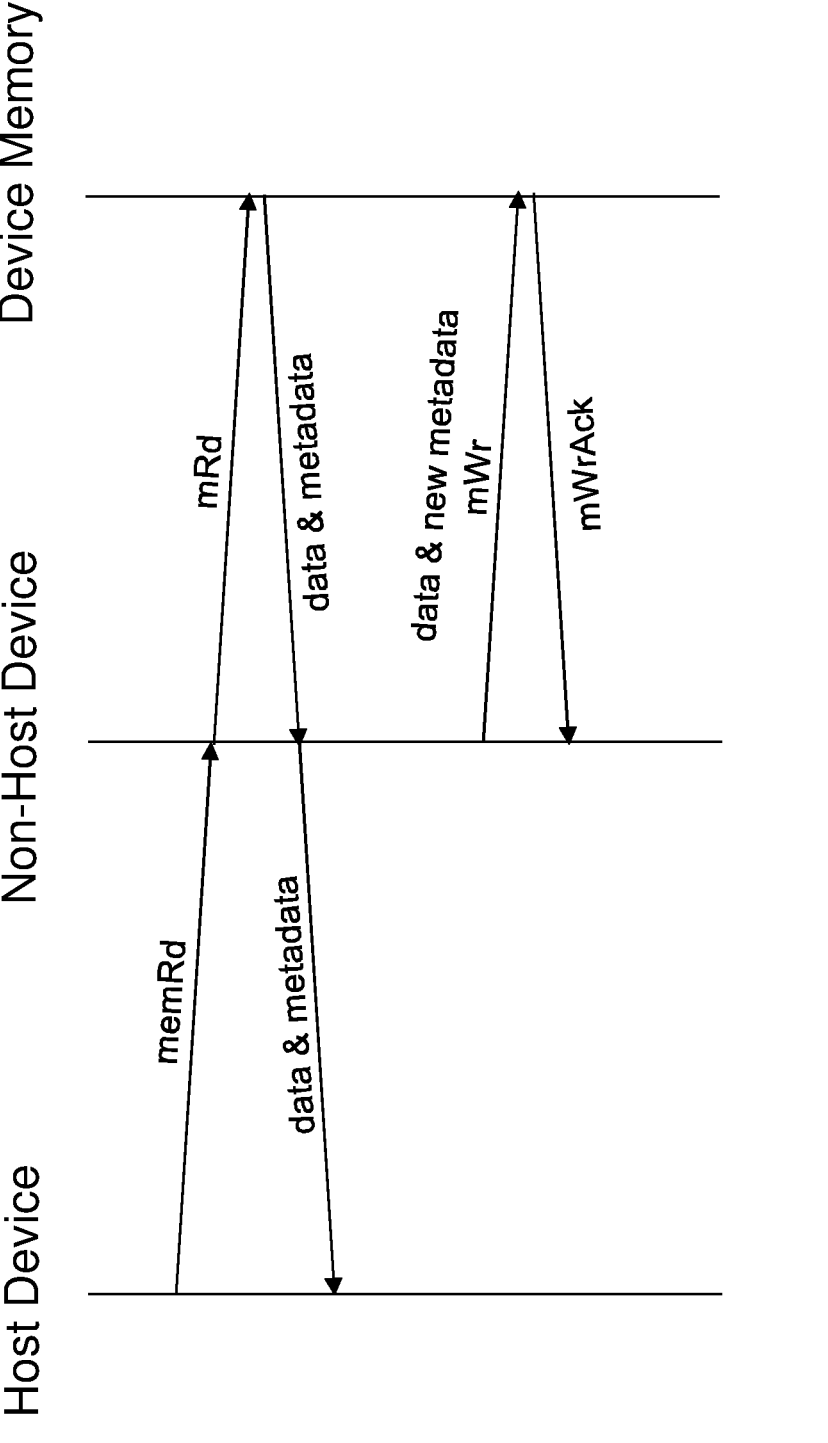
FIG. 3A through FIG. 3E illustrate example operational flows of memory read accesses.

FIG. 3A illustrates an example operational flow of memory read access in a non-host device such as a CXL Type 3 device. In response to receiving a memory read request ("memRd") from a host device, the non-host device forwards the received memory read request ("memRd")—or a memory read command ("mRd") corresponding to or generated from the received memory read request ("memRd")—to a memory controller ("MEMC") of a device memory. The memory controller proceeds to execute a corresponding memory read access operation as specified by the received memory read request ("memRd") or memory read command ("mRd") to retrieve specific data at one or more memory entries of the device memory along with specific metadata attendant to the specific data from memory media or regions of the device memory and return a memory read response back to the non-host device with the specific data and metadata. The non-host device then forwards or reports the memory read response with or without message reformation back to the host device.

Concurrently or subsequently, the non-host device checks or determines whether any metadata update conditions are met or satisfied. In an example, a metadata update condition is determined or deemed to be satisfied or met if the memory read request ("memRd") carries or is embedded with specific data field values (e.g., 1-bit flag, etc.) to indicate that new metadata is to be written to the memory media or regions of the device memory from which the existing (or pre-update) metadata was received in response to the memory read request ("memRd"). In another example, a metadata update condition is determined or deemed to be satisfied or met if the non-host device identifies or finds one or more specific data field values or a specific combination thereof in the memory read response received from the device memory.

The new metadata to be updated to the device memory may be specified in or extracted/derived from one or more data field values carried or embedded in the memory read request ("memRd"). Additionally, optionally or alternatively, the new metadata to be updated to the device memory may be generated by the non-host device itself rather than received from the host device.

In response to determining that at least one metadata update condition is met or satisfied, the non-host device proceeds to update the (existing) metadata with the new metadata (or one or more new metadata values) by issuing or sending a memory write command ("mWr") for the specific data and the new metadata attendant to the specific data to the memory controller of the device memory to write that new metadata (or values) back to the memory media or regions of the device memory.

The memory controller proceeds to execute a corresponding memory write access operation as specified by the memory write command ("mWr") for the specific data and the new metadata and return a memory write response or acknowledgment ("mWrAck") back to the non-host device in response to determining that the new metadata is updated successfully in the device memory. In some operational scenarios, the non-host device does not forward or report the memory write response or acknowledgment to the host device because the original request is a memRd request from the Host.

Example metadata or metadata values as described herein may include, but are not necessarily limited to only, any, some or all of: cache coherence related data, last read timestamp, last reader, extra 2-bit, 16-bit, 32-bit metadata field or the like. The metadata or metadata values are separate from, and in addition to, data to which the metadata is attendant. While the metadata can be updated in a memory read access or operation, the data (to which the metadata is attendant) is or was stored in the device memory by way of the non-host device in (e.g., prior, etc.) memory write transaction initiated by the host device.

3.2. Data Coherency

In some operational scenarios, the host device may be allowed to send, to the non-host device, a second memory read request to the same (host physical and/or device physical) address(es) as specified in a previous memory read request if a memory read response to the previous memory read request has been received by the host device from the non-host device, for example in accordance of an industry standard or proprietary specification (e.g., a CXL specification, a non-CXL specification, etc.) for the communication links and/or memory access operations between the host device and the non-host device.

Likewise, in some operational scenarios, the host device may be allowed to send, to the non-host device, a second memory write request for the same (host physical and/or device physical) address(es) as specified in a previous memory write request if a memory write response to the previous memory write request has been received by the host device from the non-host device, for example in accordance of the industry standard or proprietary specification.

Hence, once the host device receives a memory read or write response for a previous memory read or write request, the host device may immediately issue a second memory read or write response to the same address(es) specified in the previous memory read or write request. In some operational scenarios, the non-host device may be (e.g., entirely, mainly, etc.) responsible for making sure that data coherence is (e.g., always, typically, etc.) guaranteed in memory access operations.

Figure 3B:
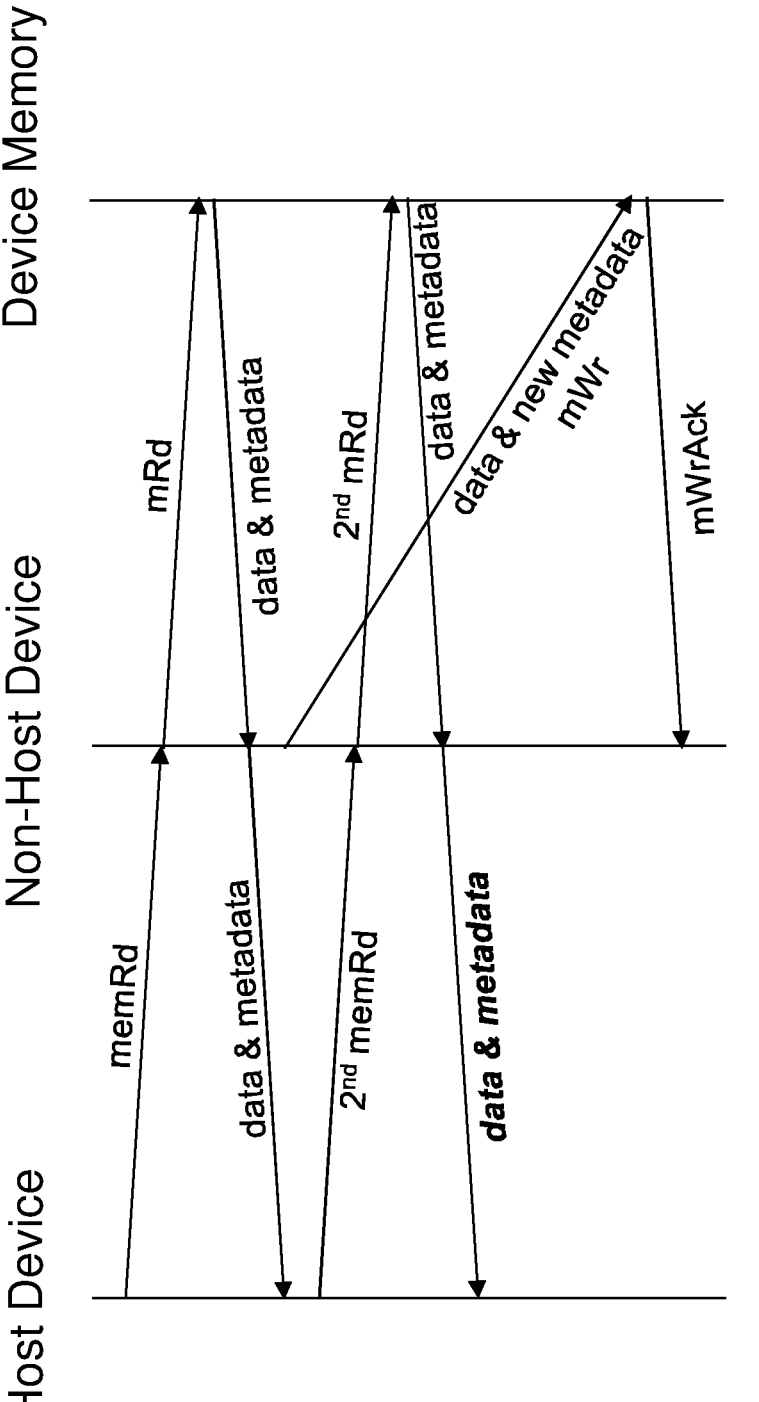

FIG. 3B illustrates an example operational flow of memory read access that may break data coherence without a careful design in a non-host device such as a CXL Type 3 device. In response to receiving a memory read request ("memRd") from a host device, the non-host device forwards the received memory read request ("memRd")—or a memory read command ("mRd") corresponding to or generated from the received memory read request ("memRd")—to a memory controller ("MEMC") of a device memory. The memory controller proceeds to execute a corresponding memory read access operation as specified by the received memory read request ("memRd") or memory read command ("mRd") to retrieve specific data at one or more memory entries of the device memory along with specific metadata attendant to the specific data from memory media or regions of the device memory and return a memory read response back to the non-host device with the specific data and metadata. The non-host device then forwards or reports the memory read response with or without message reformation back to the host device.

Concurrently or subsequently, the non-host device checks or determines whether any metadata update conditions are met or satisfied. In response to determining that at least one metadata update condition is met or satisfied, the non-host device proceeds to update the (existing) metadata with the new metadata (or one or more new metadata values) by issuing or sending a memory write command ("mWr") for the specific data and the new metadata attendant to the specific data to the memory controller of the device memory to write that new metadata (or values) back to the memory media or regions of the device memory. This write operation may be carried out by the memory controller as a partial write that writes the new metadata only or a full write that writes both the data (which may be unchanged) and the metadata, depending on specific memory controller implementations.

Meanwhile, in response to receiving the memory read response with the specific data and metadata from the non-host device for the first read request, the host device may immediately issue or send a second memory read request ("$2^{nd}$ memRd") to the non-host device, which may specify the same memory physical address(s) as in the (previous) memory read request.

In response to receiving the second memory read request ("$2^{nd}$ memRd") from the host device, the non-host device forwards the received $2^{nd}$ memory read request ("$2^{nd}$ memRd")—or a second memory read command ("$2^{nd}$ mRd") corresponding to or generated from the received second memory read request ("$2^{nd}$ memRd")—to the memory controller ("MEMC") of the device memory. The memory controller proceeds to execute a corresponding memory read access operation as specified by the received $2^{nd}$ memory read request ("$2^{nd}$ memRd") or memory read command ("$2^{nd}$ mRd") to retrieve the same specific data at the one or more memory entries of the device memory along with the same specific metadata attendant to the specific data from memory media or regions of the device memory and return a second memory read response back to the non-host device with the same specific data and metadata. The non-host device then forwards or reports the second memory read response containing the same specific data and metadata as in the (previous) memory read response with or without message reformation back to the host device.

The memory controller ("MEMC") may have or set up independent or separate (read or write) queues for memory write and read commands and may also give or assigned the read queue a higher priority than the write queue to purposely reduce average read latency. Hence, it may happen that the second memory read command may get served or executed by the memory controller ("MEMC") before the memory write commend for updating the new metadata at the same address(es) of the previous read request. As a result, the memory controller ("MEMC") reads the old or staled data and/or metadata (values) from the memory media or regions and return the old or staled data and/or metadata (values) to the host device before the new metadata (values) are written to the memory media or regions, thereby causing data coherence issues.

3.3. Conservative Design

Figure 3C:
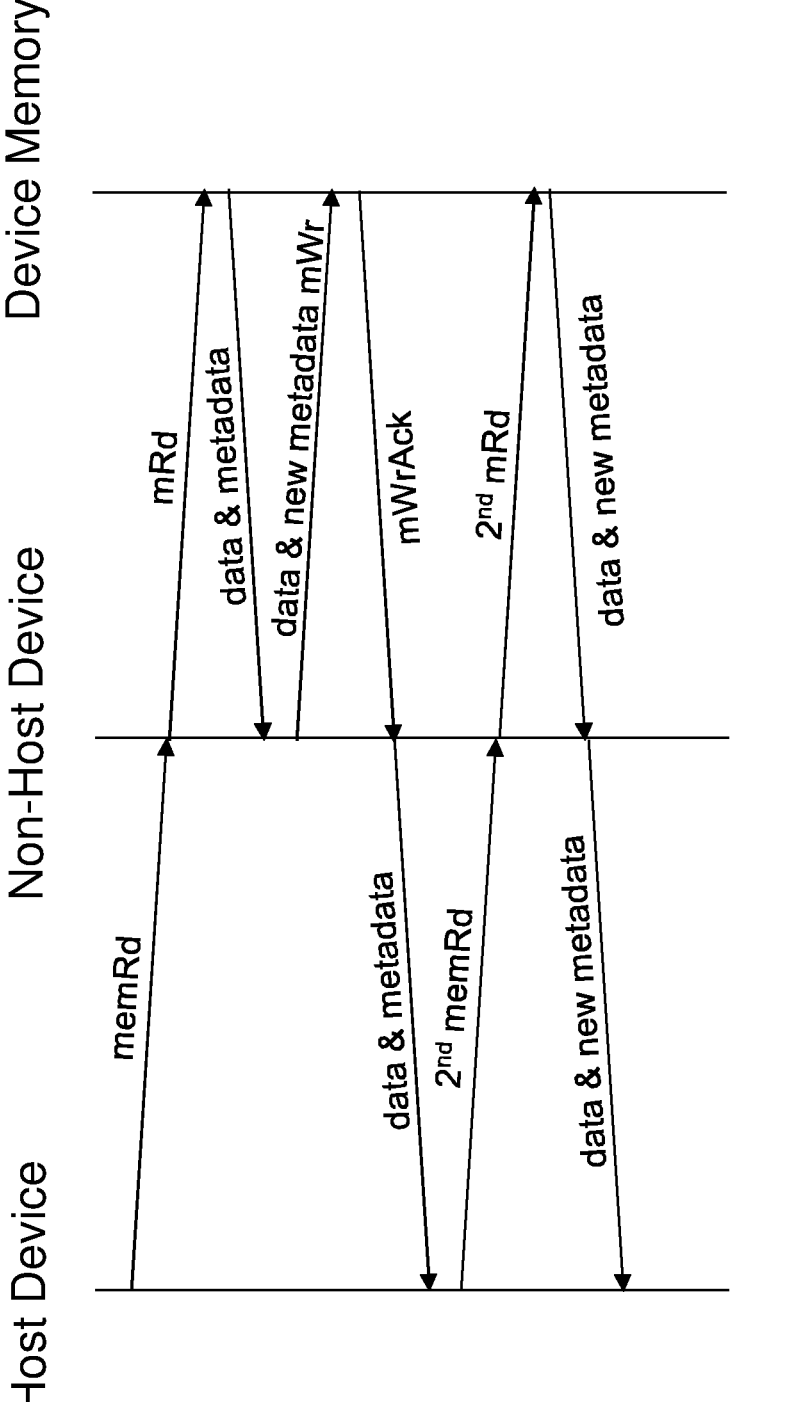

FIG. 3C illustrates an example operational flow of memory read access that maintains data coherence with a conservative design in a non-host device such as a CXL Type 3 device. In response to receiving a memory read request ("memRd") from a host device, the non-host device forwards the received memory read request ("memRd")—or a memory read command ("mRd") corresponding to or generated from the received memory read request ("memRd")—to a memory controller ("MEMC") of a device memory. The memory controller proceeds to execute a corresponding memory read access operation as specified by the received memory read request ("memRd") or memory read command ("mRd") to retrieve specific data at one or more memory entries of the device memory along with specific metadata attendant to the specific data from memory media or regions of the device memory and return a memory read response back to the non-host device with the specific data and metadata.

In response to receiving the memory read response from the device memory or the memory controller ("MEMC") therein, the non-host device checks or determines whether any metadata update conditions are met or satisfied. In response to determining that at least one metadata update condition is met or satisfied, the non-host device proceeds to update the (existing) metadata with the new metadata (or one or more new metadata values) by issuing or sending a memory write command ("mWr") for the specific data and the new metadata attendant to the specific data to the memory controller of the device memory to write that new metadata (or values) back to the memory media or regions of the device memory.

The memory controller proceeds to execute a corresponding memory write access operation as specified by the memory write command ("mWr") for the specific data and the new metadata and return a memory write response or acknowledgment ("mWrAck") back to the non-host device in response to determining that the new metadata is updated successfully in the device memory.

In response to receiving the memory write response or acknowledgment ("mWrAck"), the non-host device then now forwards or reports the memory read response with or without message reformation back to the host device.

In response to receiving the memory read response with the specific data and metadata from the non-host device, the host device may immediately issue or send a second memory read request ("$2^{nd}$ memRd") to the non-host device, which may specify the same memory physical address(es) as in the (previous) memory read request.

In response to receiving the second memory read request ("$2^{nd}$ memRd") from the host device, the non-host device forwards the received $2^{nd}$ memory read request ("$2^{nd}$ memRd")—or a second memory read command ("$2^{nd}$ mRd") corresponding to or generated from the received second memory read request ("$2^{nd}$ memRd")—to the memory controller ("MEMC") of the device memory. The memory controller proceeds to execute a corresponding memory read access operation as specified by the received $2^{nd}$ memory read request ("$2^{nd}$ memRd") or memory read command ("$2^{nd}$ mRd") to retrieve the specific data at the one or more memory entries of the device memory along with the new metadata attendant to the specific data from memory media or regions of the device memory and return a second memory read response back to the non-host device with the specific data and new metadata. The non-host device then forwards or reports the second memory read response containing the specific data and new metadata with or without message reformation back to the host device.

Under this conservative design, data coherence issues relating to FIG. 3B are avoided. Instead of returning the specific data and metadata to the host device right away upon receiving the (first) memory read response from the memory controller ("MEMC"), the non-host device updates and writes the new metadata to the memory media or regions, and then waits until the non-host device receives the memory write response from the memory controller ("MEMC") before returning the already received memory read response with or without message reformation to the host device. As a result, the non-host device guarantees that the new metadata (values) has already been written into the memory media when the host device receives the memory read response. Hence after the host device issues the new or second memory read request specifying the same address(es) as in the (first or previous) memory read request issued by the host device, the non-host device can still read the new metadata from the memory media or regions and return the correct updated or new metadata to the host device.

This conservative operational flow, however, causes a large round-trip read latency seen at the host side. This round-trip latency may become even worse if the memory write command for metadata gets served by the memory controller ("MEMC") with a relatively long stall or delay caused by many pending or waiting memory write requests already lining up or currently being queued in the write queue or by the memory media under an auto-refresh time.

3.4. Optimized Design

Techniques as described herein can be used to reduce memory read latency such as round-trip latency relating to processing memory read requests that may involve memory write operations for metadata updates.

Figure 3D:
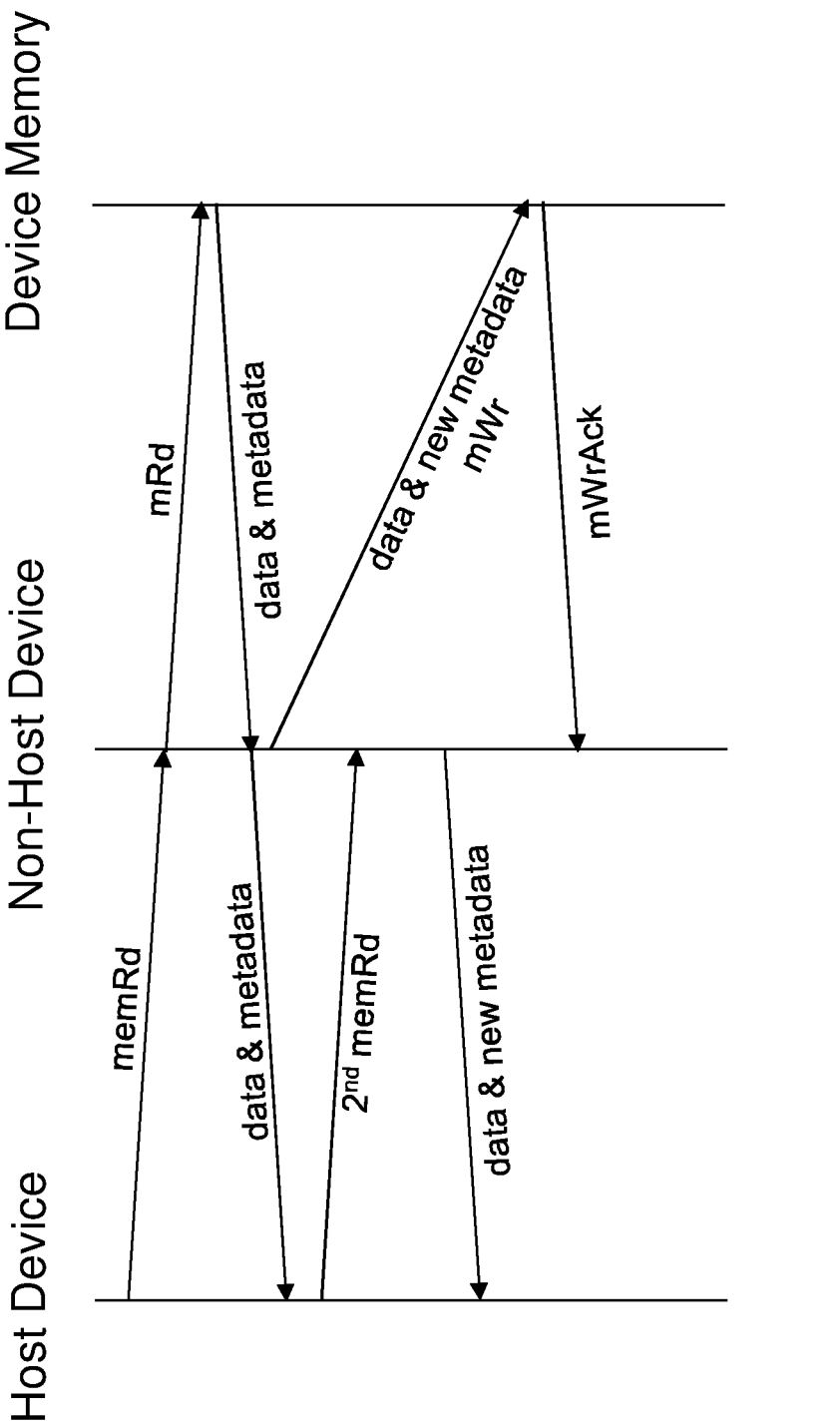

With additional reference to FIG. 1 and FIG. 2, FIG. 3D illustrates an example operational flow (with an imaginary downward direction as the time direction) of memory read access that maintains data coherence with an optimized latency reduction design in a non-host device 106 of FIG. 1 such as a CXL Type 3 device, a non-CXL-Type-3 device or a non-CXL device.

In response to receiving a memory read request ("memRd") from a host device 102 of FIG. 1, the non-host device 106 enqueues or temporarily store the memory read request ("memRd") in a memory read request FIFO 202 ("RD Req Fifo") of FIG. 2. At each (clock) cycle, the non-host device 106 dequeues a certain number (e.g., one (1), two (2), etc.) of memory read requests at or from the head of the memory read request FIFO 202 ("RD Req Fifo").

For the purpose of illustration only, at a first time point, the memory read request ("memRd") is dequeued from the memory read request FIFO 202 ("RD Req Fifo").

The non-host device 106 determines with a lookup operation whether specific data and attendant metadata at the same address(es) specified by the memory read request ("memRd") for memory read operations exist in a temporary writeback buffer (TWB) 208 of FIG. 2.

In response to determining (e.g., a cache hit, etc.) that the specific data and attendant metadata exist in the temporary writeback buffer (TWB) 208, the non-host device retrieves the specific data and attendant metadata as hit result from the temporary writeback buffer (TWB) 208 and forwards the hit result to a memory read response arbiter 204 ("RD Resp Arb"). The non-host device or the memory read response arbiter therein forwards the specific data and attendant metadata from the temporary writeback buffer (TWB) 208 in a memory read response to the host device 102.

On the other hand, as illustrated in FIG. 3D and FIG. 2, in response to determining (e.g., a cache hit, etc.) that the specific data and attendant metadata do not exist in the temporary writeback buffer (TWB) 208, the non-host device forwards the memory read request ("memRd")—or a memory read command ("mRd") corresponding to or generated from the received memory read request ("memRd")—to a memory controller 116 ("MEMC") of a device memory 118 of FIG. 1. The memory controller 116 proceeds to execute a corresponding memory read access operation as specified by the received memory read request ("memRd") or memory read command ("mRd") to retrieve specific data at one or more memory entries of the device memory 118 along with specific metadata attendant to the specific data from memory media or regions of the device memory and return a memory read response back to the non-host device 106 with the specific data and metadata. The non-host device or the memory read response arbiter 204 ("RD Resp Arb") therein then forwards or reports the memory read response with or without message reformation back to the host device 102.

Concurrently or subsequently, the non-host device checks or determines whether any metadata update conditions are met or satisfied. In response to determining that no metadata update condition is met or satisfied, the non-host device does nothing.

On the other hand, as illustrated in FIG. 3D and FIG. 2, in response to determining that at least one metadata update condition is met or satisfied, the non-host device proceeds to invoke a metadata update operation, block or module to generate or determine new metadata (or one or more new metadata values) to replace the existing metadata attendant to the specific data, to enqueue or send a memory write command ("mWr", which may also be referred to as "WR Req") for metadata update using the specific data and the new metadata attendant to the specific data to a memory write request arbiter 210 ("WR Req Arb"), and to buffers/caches the specific data and the new metadata attendant to the specific data along with their address information in the temporary writeback buffer (TWB) 208.

The non-host device 106 also maintains a memory write request FIFO 212 ("WR Req Fifo") of FIG. 2 to enqueue or temporarily store received memory write requests—or corresponding memory write commands generated from the received memory write requests from the host device 102.

For the purpose of illustration only, at a second time point later than the first time point, the non-host device 102 or the memory write request arbiter 210 ("WR Req Arb") dequeues the memory write command ("mWr" or "WR Req") for metadata update (e.g., with priority over those assigned to memory write requests received from the host device 102 and stored in the memory write request FIFO, etc.) and send the memory write command ("mWr" or "WR Req") to the memory controller 116 of the device memory 118 to write that new metadata (or values) back to the memory media or regions of the device memory.

The memory controller proceeds to execute a corresponding memory write access operation as specified by the memory write command ("mWr" or "WR Req") for the specific data and the new metadata and return a memory write response or acknowledgment ("mWrAck") back to the non-host device in response to determining that the new metadata is updated successfully in the device memory. The non-host device proceeds to invalidate or (e.g., logically, etc.) remove (e.g., the TWB cached entry storing, etc.) the specific data and the new metadata in the temporary writeback buffer.

As noted, in response to receiving the (first) memory read response with the specific data and metadata from the non-host device to the (first) memory read request ("memRd"), the host device 102 may immediately issue or send a second memory read request ("2$^{nd}$ memRd") to the non-host device 106, which may specify the same host physical or device physical address(s) as in the (first or previous) memory read request ("memRd").

In response to receiving the second memory read request ("2$^{nd}$ memRd") from the host device, the non-host device 106 enqueues the second memory read request ("2$^{nd}$ memRd") in the memory read request FIFO 202 ("RD Req Fifo") of FIG. 2. At each (clock) cycle, the non-host device 106 dequeues a certain number (e.g., one (1), two (2), etc.) of memory read requests.

For the purpose of illustration only, at a third time point after the first time point, the second memory read request ("2$^{nd}$ memRd") is dequeued from the memory read request FIFO 202 ("RD Req Fifo").

The non-host device 106 determines with a second lookup operation whether any valid data and attendant metadata at the same address(es) specified by the second memory read request ("2$^{nd}$ memRd") for second memory read operations exist in the temporary writeback buffer (TWB) 208 of FIG. 2.

In the present example, the memory write request/command ("mWr" or "WR Req") is still in progress and has not been completed. Hence, the buffer entry storing the specific data and the new metadata attendant to the specific data in the temporary writeback buffer (TWB) 208 is still valid. As a result, in response to determining (e.g., a cache hit, etc.) that the specific data and attendant new metadata exist in the temporary writeback buffer (TWB) 208, the non-host device retrieves the specific data and attendant new metadata as second hit result from the temporary writeback buffer (TWB) 208 and forwards the second hit result to the memory read response arbiter 204 ("RD Resp Arb"). The non-host device or the memory read response arbiter therein forwards the specific data and attendant new metadata from the temporary writeback buffer (TWB) 208 in a second memory read response ("2$^{nd}$ memRd") to the host device 102.

Under this optimized design, the non-host device 106 can return the (first) memory read response to the host device 102 immediately upon receiving the corresponding memory read response or result from the memory media or the memory controller 116 of the device memory 118. As a result, the round-trip latency associated with the processing (first) memory read request end-to-end between the host device 102 and the device memory 118 is the same as a normal RD operation in a design with data coherency issues as illustrated in FIG. 3B. Concurrently or shortly afterwards, the non-host device 106 can enqueue a memory write request for metadata update operations that write the new metadata (values) to the memory media or regions of the device memory 118. In the meantime, the non-host device 106 also caches, stores or buffers the specific data read from the device memory 118 and the updated or new metadata (values) that is still being written to the device memory 118 to a cache/buffer entry in a local buffer (local to the non-host device 106) such as the temporary writeback buffer (TWB) 208. The cache/buffer entry will be invalidated upon receiving the memory write response or acknowledgment ("mWrAck") from the device memory 118 or the memory controller 116.

In some operational scenarios, if the host device 102 issues a new or second memory read request to the same address as specified with the (previous or first) memory read request or its memory read response before the cache/buffer entry in the temporary writeback buffer ("TWB") 208 gets invalidated, the non-host device 106 can immediately return the specific data and new metadata stored in the entry of the temporary writeback buffer ("TWB") 208 to the host device 102. In these operational scenarios, the round-trip latency is much smaller than a normal RD operation in other approaches.

In some operational scenarios, the cache/buffer entry may have been invalidated in response to receiving a memory write response or acknowledgement from the device memory 118, which means that the new metadata (values) was already written to the memory media or device memory 118. In these operational scenarios, the non-host device 106 can just read the memory media in response to receiving a subsequent memory read request from the host device 102, and returns a subsequent memory read response back to the host device as normal or in the same way as the (first) memory read response from the host device 102 is handled or processed in FIG. 3D. Hence, in all these operational scenarios, technique as described herein can be implemented to process host originated memory read requests with the same or smaller round-trip latency as compared with other approaches.

3.5. Successive Metadata Updates

Figure 3E:
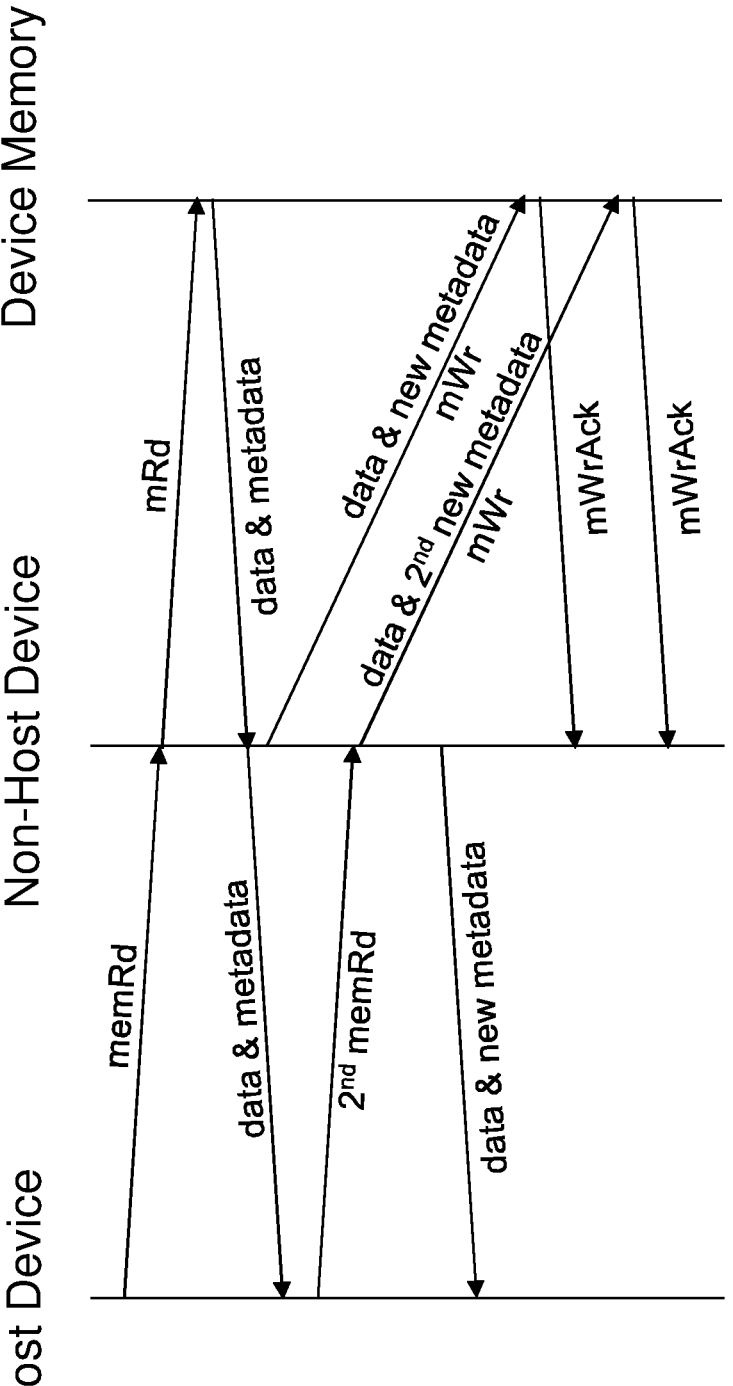

With additional reference to FIG. 1 and FIG. 2, FIG. 3E illustrates an example operational flow (with an imaginary downward direction as the time direction) of memory read access that maintains data coherence with an optimized latency reduction design in a non-host device 106 of FIG. 1 such as a CXL Type 3 device, a non-CXL-Type-3 device or a non-CXL device. This example operational flow is similar to what is illustrated in FIG. 3D, except that the second memory read request ($2^{nd}$ memRd) from the host device 102 is determined by the non-host device 106 to satisfy or meet at least one metadata update condition.

Hence, as illustrated in FIG. 3E, a second memory write request or command for metadata update to write second new metadata (values) attendant to the specific data may be generated by the non-host device 106 or the metadata update operation/block/module therein and enqueued or sent to the memory write request arbiter 210 ("WR Req Arb") of FIG. 2 for carrying out the request $2^{nd}$ new metadata write operation with the device memory 118.

In the meantime, the cache/buffer entry in the temporary writeback buffer (TWB) 208 as mentioned in connection with FIG. 3D can be used to provide the specific data and the new metadata that is being written to the device memory 118 by a first memory write request or command for metadata update to write the new metadata (values) attendant to the specific data.

The memory controller 116 may be implemented to perform earlier received memory write request (e.g., for metadata update, for all write requests, etc.) earlier than later received memory write request. In addition, to maintain data coherency, the non-host device 106 may be implemented to use earlier cached valid entry in the temporary write back buffer (TWB) 208 earlier than later cached valid entry if there are more than one valid entry for the same address(es) in the device memory 118.

3.6. Example Process Flows

Figure 4A:
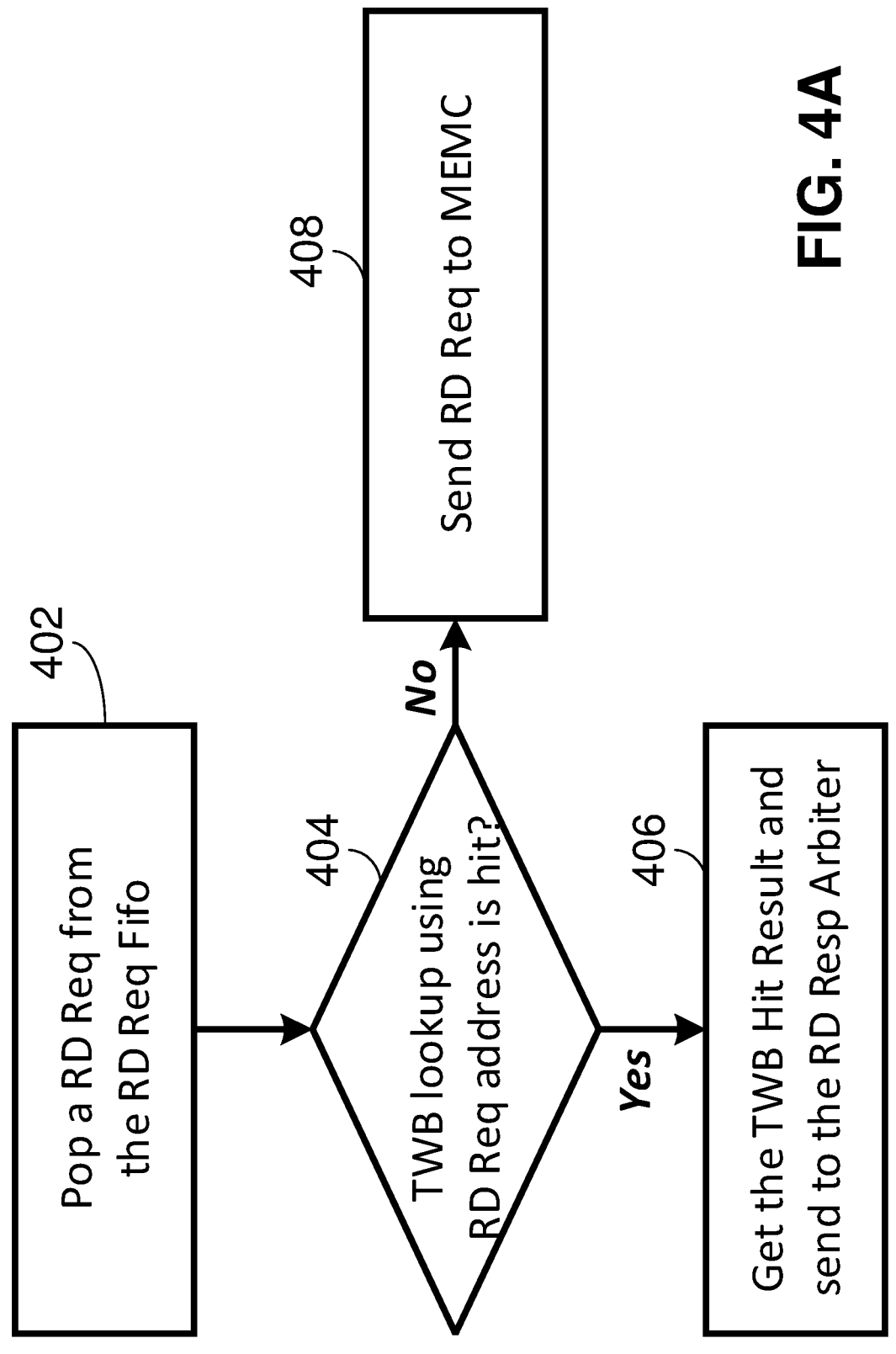
FIG. 4A through FIG. 4E illustrates example process flows.

FIG. 4A illustrates an example process flow for processing memory read requests received by a non-host device (e.g., 106 of FIG. 1, etc.) from a host device (e.g., 102 of FIG. 1, etc.). This process flow may be executed by the non-host device 106. Block 402 comprises, for each clock cycle, popping or dequeuing a memory read request ("RD Req" in a memory read request FIFO 202 ("RD Req Fifo"). Block 404 comprises using address(es) specified in the memory read request to perform a lookup into a temporary writeback buffer (TWB) 208. Block 406 comprises, in response to determining that there is a hit with one or more valid entries in the temporary writeback buffer (TWB) 208 for the address(es), retrieving specific data and metadata attendant to the specific data for the address(es) and sending the retrieved specific data and metadata to a memory read response arbiter 204 ("RD Resp Arb"). On the other hand, block 408 comprises, in response to determining that there is a miss or not a hit in the temporary writeback buffer (TWB) 208 for the address(es), then the memory read request or a corresponding memory read command is forwarded or sent to a memory controller (MEMC; e.g., 116 of FIG. 1, etc.) of a device memory (e.g., 118 of FIG. 1, etc.).

Figure 4B:
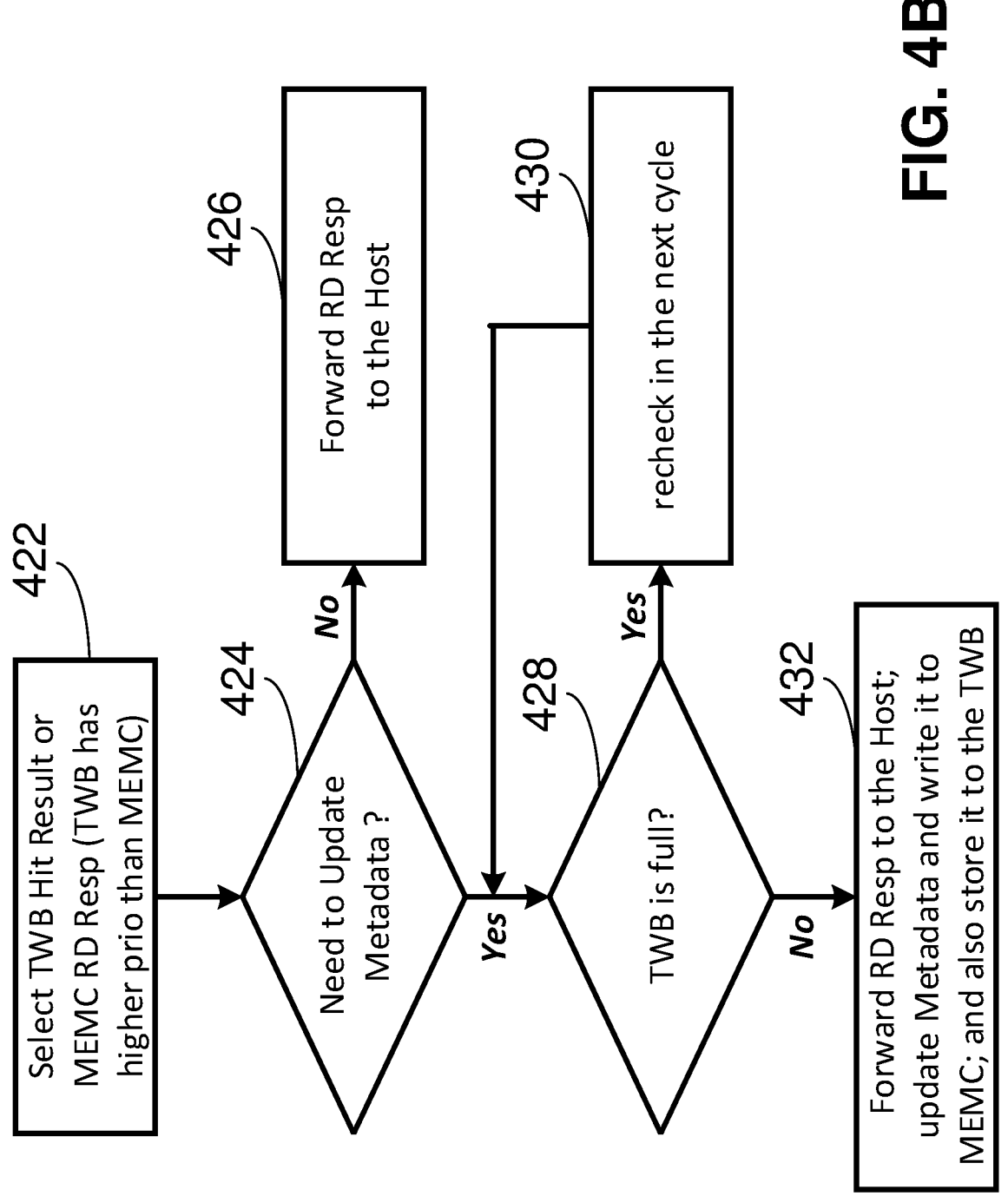

FIG. 4B illustrates an example process flow for processing memory read responses. This process flow may be executed by the non-host device 106. Block 422 comprises, for each clock cycle, determining—for example, by a memory read response arbiter 204 ("RD Resp Arb") of FIG.

2—whether one or both of (1) a TWB hit result and (2) a (MEMC originated) memory read response ("MEMC RD resp") from a memory controller 116 of a device memory 118 of FIG. 1 are received in connection with a (host-originated) memory read request from a host device 102 of FIG. 1.

In response to determining that only one of (1) a TWB hit result and (2) a (MEMC originated) memory read response is received in connection with the (host originated) memory read request in the same clock cycle, the memory read response arbiter 204 ("RD Resp Arb") selects that only one of the TWB hit result or MEMC memory read response.

On the other hand, in response to determining that both of (1) a TWB hit result and (2) a (MEMC originated) memory read response are received in connection with the (host originated) memory read request in the same clock cycle, the memory read response arbiter 204 ("RD Resp Arb") gives the priority to, and selects, the TWB hit result. One reason for this arbitration priority is that cache/buffer entries in the TWB 208 get invalidated upon receiving corresponding memory write acknowledgements from the memory controller 116 as previously noted, so life cycles of these cache/buffer entries are relatively short, meaning that the probability of a TWB hit is relatively small. Therefore, if a TWB hit does happen, a higher priority is assigned by the read response arbiter to minimize latency. A second reason for this arbitration priority is that, by giving higher priority to the TWB hit result, the (host-originated) memory read request can be immediately popped or dequeued from a memory read request FIFOs 202 ("RD Req Fifo"), thereby avoiding or reducing FIFO building up by pending memory read requests and reducing backpressure to the host device in sending memory read requests on its memory read request path.

The TWB hit result or (MEMC originated) memory read response as selected by the arbiter may be used as, or to generate, a—non-host-originated, host-bound, waiting, possibly to-be-cached if a metadata update is called for— memory read response to the (host-originated) memory read request from the host device 102. The following blocks may be used or executed to send the (waiting) memory read response to the host device 102.

Block 424 comprises determining or checking whether a metadata update is needed for the memory read response or determining whether any metadata update condition is satisfied or met.

Block 426 comprises, in response to determining that no metadata update condition is satisfied or met, returning or forwarding the memory read response ("RD Resp") generated from either the TWB hit result or (MEMC originated) memory read response to the host device 102 immediately.

Block 428 comprises, in response to determining that at least one metadata update condition is satisfied or met, determining whether the TWB 208 is full—or whether all cache/buffer entries are used up.

Block 430 comprises, in response to determining that the TWB 208 is full, do nothing in the current clock cycle and rechecking whether the TWB 208 is full in the next clock cycle. Because the TWB 208 only temporarily stores data from different memory read responses in the entries until these entries are invalidated by the corresponding memory write acknowledgment for metadata update ("WR Resp Acks"), eventually an entry in the TWB 208 will be invalidated and hence become available for the (waiting or to-be-cached) memory read response ("RD Resp") at the metadata update block 206 of FIG. 2.

Block 432 comprises, in response to determining that an entry is available in the TWB 208, returns or forwarding the waiting memory read response ("RD Resp") to the host device 102. Concurrently or at the same time, the non-host device 106 or the metadata update block/module 206 therein updates the metadata or generate new metadata; writes the new metadate value with a (metadata update) memory write request to the memory controller 116 (MEMC) of the device memory 118; stores the data and the new metadata (values) attendant to the data to the (available) entry in the TWB 208. The entry is now (e.g., again, etc.) marked as unavailable. The entry can be invalidated later when the corresponding memory write acknowledgement is received from the memory controller 116 (MEMC) of the device memory 118 for the (metadata update) memory write request.

Figure 4C:
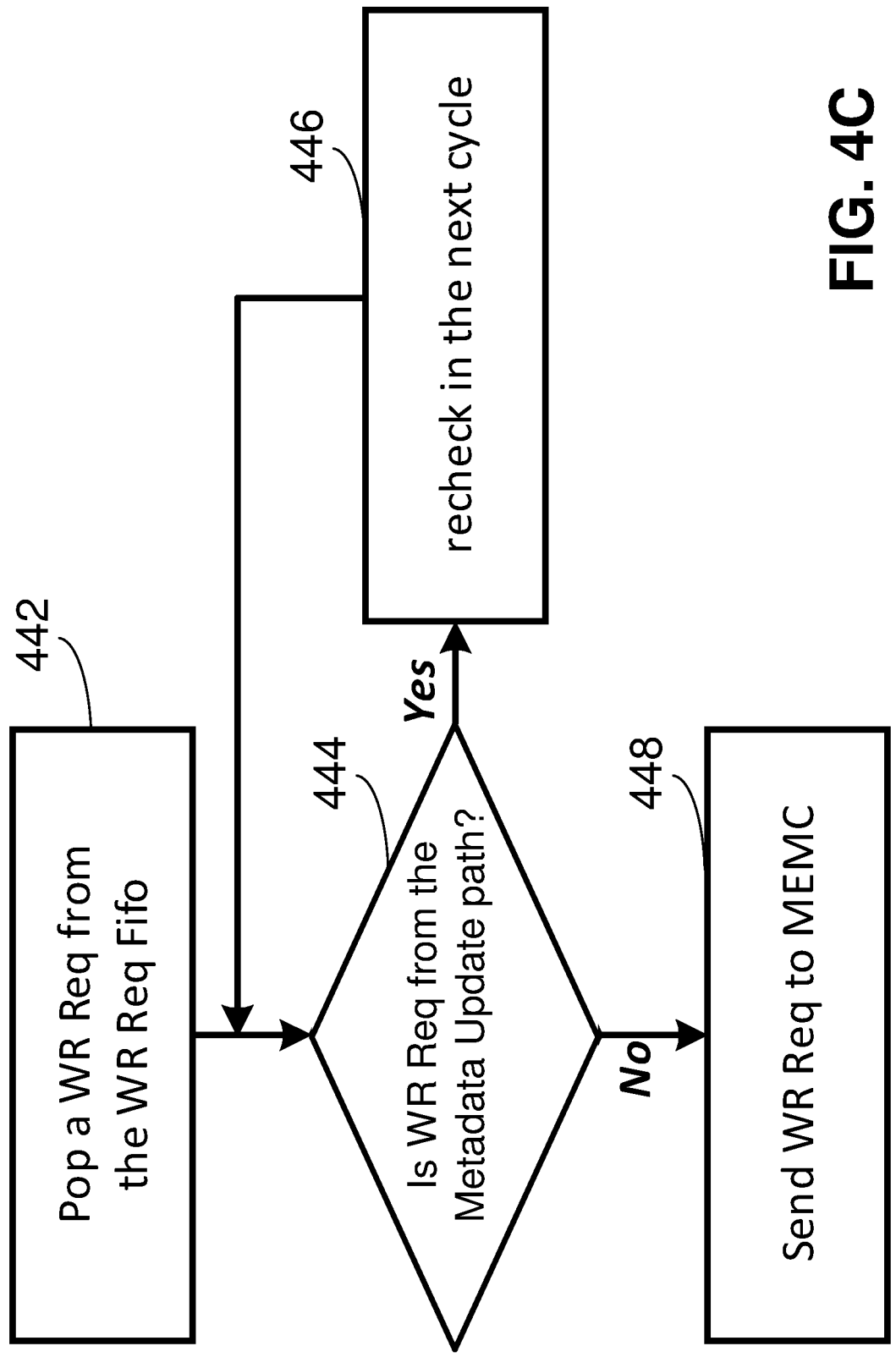

FIG. 4C illustrates an example process flow for processing memory write requests. This process flow may be executed by the non-host device 106. Block 442 comprises, for each clock cycle, popping or dequeuing a memory write request ("WR Req") from a memory write request FIFO 212 ("WR Req Fifo") and forwarding the memory write request to a memory write request arbiter 210 ("WR Req Arb").

Block 444 comprises determining whether one or both of (1) a host-originated input memory write request and (2) a (metadata update, non-host-device originated) memory write request are received.

In response to determining that only one of (1) a host-originated input memory write request and (2) a (metadata update, non-host-device originated) memory write request is received in the same clock cycle, the memory write request arbiter 210 ("WR Req Arb") selects that memory write request.

On the other hand, in response to determining that both of (1) a host-originated input memory write request and (2) a (metadata update, non-host-device originated) memory write request is received in the same clock cycle, the memory write request arbiter 210 ("WR Req Arb") gives the priority to, and selects, the (metadata update, non-host-device originated) memory write request in the metadata update path. One reason for this priority consideration is that the metadata update memory write request is a subsequent step in, or originated from, a memory read operation, so the memory read operation may have already incurred a relatively significant latency; hence it is reasonable to give the metadata update memory write request a higher priority to be sent to the memory controller 116 (MEMC) of the device memory 118 to reduce an overall total latency of responding to a host-originated memory read request. A further reason is that this priority consideration or choice better guarantees data coherence at the memory media or regions of the device memory 118. As the memory read response ("RD Resp") is returned to the host device 102, the host device 102 can immediately issue a (host-originated) memory write request ("WR Req") to the same address as the already returned memory read response ("RD Resp"). By giving or assigning a higher priority to the metadata update memory write request, the (host-originated) memory write request is guaranteed to reach the memory media after the metadata update memory write request, thereby ensuring that the memory media or regions of the device memory 118 have the correct (latest write) data and metadata for memory write requests (and/or memory read requests) from the host device 102.

Block 446 comprises, in response to determining that the dequeued memory write request ("WR Req") is a metadata update memory write request from the metadata update path, determining whether the metadata update memory write request is already sent in a previous clock cycle. In response to the determining that the metadata update memory write request is not already sent in a previous clock cycle, the memory write request arbiter of FIG. 2 sends the memory write request to the memory controller 116 (MEMC) of the device media 118. On the other hand, in response to the determining that the metadata update memory write request is already sent in a previous clock cycle, the memory write request arbiter of FIG. 2 does nothing (for the still going metadata update) and rechecks in the next clock cycle.

Block 448 comprises, in response to determining that the dequeued memory write request ("WR Req") is a host-originated memory write request from the host device 102, sending the memory write request to the memory controller 116 (MEMC) of the device media 118.

Figure 4D:
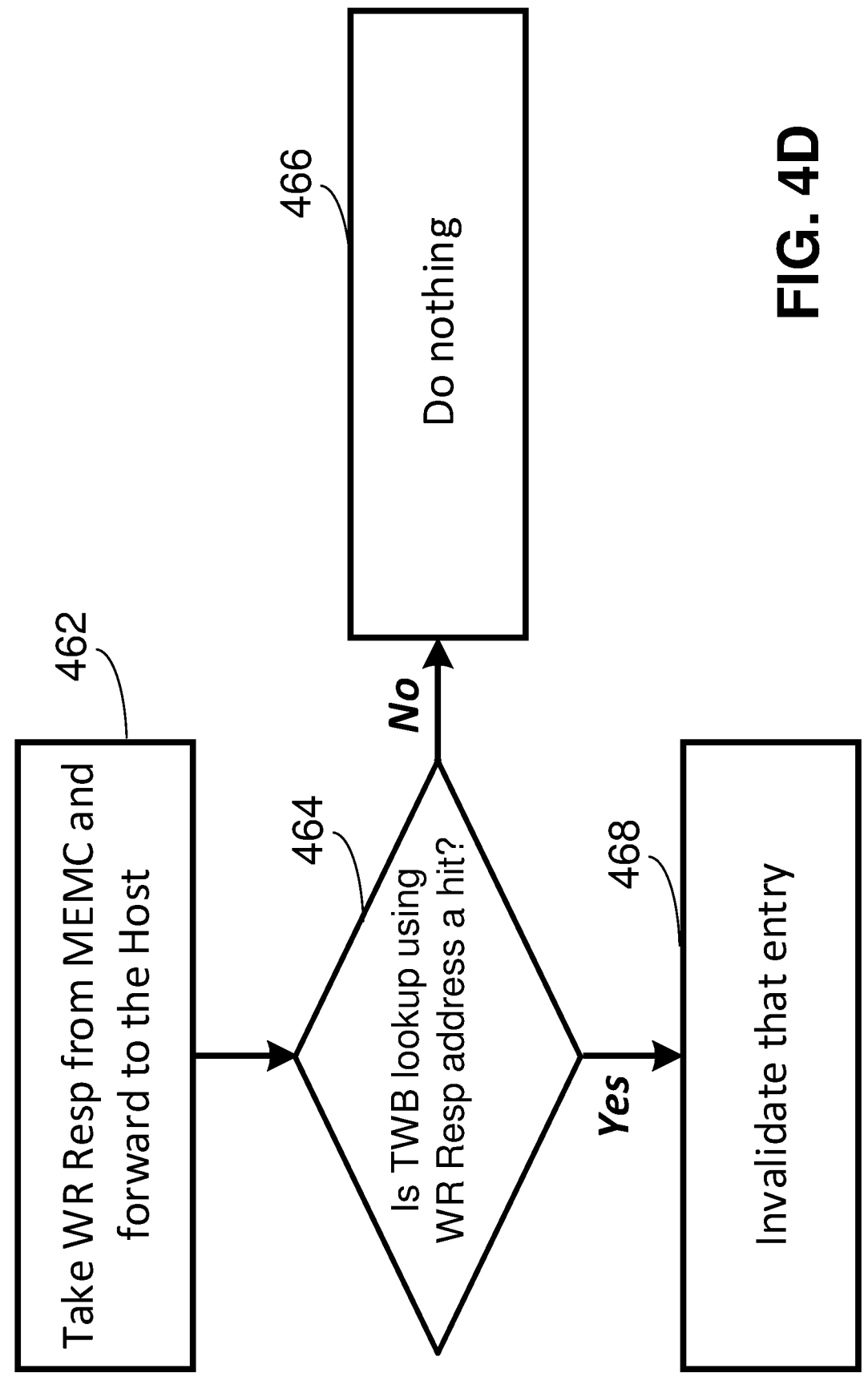

FIG. 4D illustrates an example process flow for processing memory write responses. This process flow may be executed by the non-host device 106. Block 462 comprises, for each clock cycle, taking or receiving (e.g., any, available, etc.) memory write response or acknowledgment ("WR Resp") from the memory controller 116 (MEMC) of the device memory 118 (if any). In response to determining that the memory write response or acknowledge is related to a host-originate memory write command or request, the non-host device 106 returns the memory write response with or without message transformation to the host device 102. Otherwise, in response to determining that the memory write response or acknowledge is related to a memory write command or request initiated by the non-host device 106 in the metadata update path, the non-host device 106 does not send or return the memory write response with or without message transformation to the host device 102.

Block 464 comprises, concurrently or subsequently, checking or determining whether any valid cache/buffer entry in the TWB 208 has the same address as the (MEMC originated) memory write response/acknowledgment ("WR Resp").

Block 466 comprises, doing nothing in response to determining that no valid entry in the TWB 208 has the same address as the (MEMC originated) memory write response or acknowledgment ("WR Resp").

Block 468 comprises, in response to determining that a valid entry in the TWB 208 has the same address as the (MEMC originated) memory write response or acknowledgment ("WR Resp"), invalidating that entry in the TWB 208 so that the entry is now available for another metadata update request on-the-fly if any.

Figure 4E:
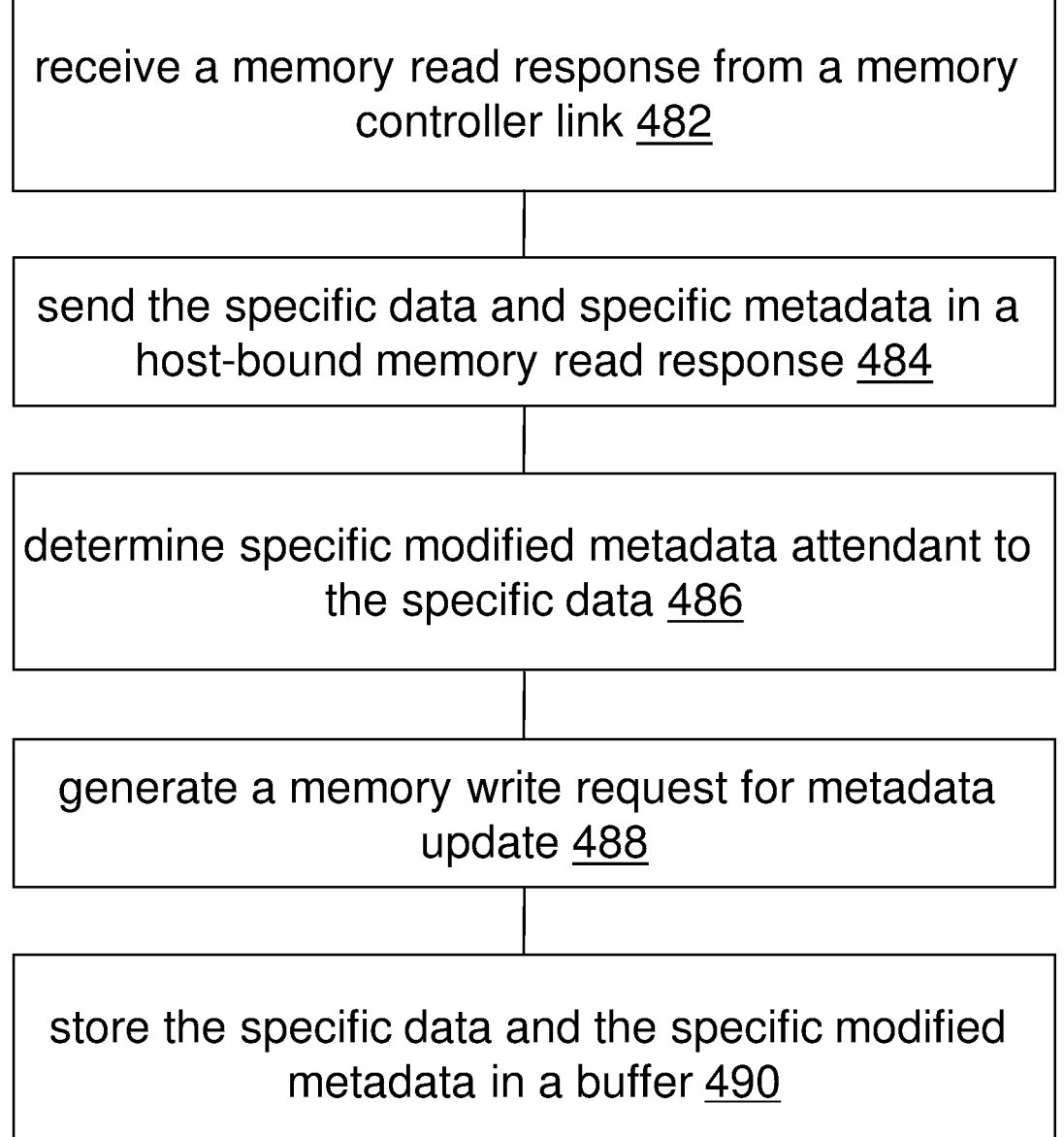

FIG. 4E illustrates an example process flow, according to an embodiment. The various elements of the flow described below may be performed with one or more computing devices implementing a non-host device (e.g., memory accelerator, non-host computing device, memory expander, a non-host read/write controller, etc.) used to enable memory access operations with respect to memory device(s) attached to the non-host device.

In block 482, the non-host device receives a memory read response from a memory controller (MEMC) of a device memory in response to a memory request previously sent to the memory controller, the memory read response from the memory controller including specific data and specific metadata attendant to the specific data retrieved with one or more specific memory addresses in the device memory.

In block 484, the non-host device sends, to a host device, the specific data and specific metadata in a host-bound memory read response derived from the memory read response received from the memory controller.

In block 486, in response to determining that a metadata update condition is satisfied, the non-host device determines specific modified metadata attendant to the specific data.

In block 488, the non-host device generates a MEMC-bound memory write request for metadata update, the MEMC-bound memory write request being used to write the specific modified metadata attendant to the specific data in the device memory.

In block 490, the non-host device stores the specific data and the specific modified metadata in an entry of a temporary write buffer until the entry is invalidated.

In an embodiment, the memory read request previously sent to the memory controller corresponds to a first host-originated memory read request received at a first time point from the host device; a second host-originated memory read request is received at a second time point later than the first time point from the host device; wherein the specific data and the specific modified metadata are sent to the host device in a second host-bound memory read response derived from a hit result in the temporary write buffer.

In an embodiment, at least one metadata update condition is satisfied in connection with the second host-originated memory read request; a second memory write request is generated to write second specific modified metadata attendant to the specific data in the device memory; the second specific modified metadata is stored in a second entry of the temporary write buffer until the second entry is invalidated.

In an embodiment, the entry of the temporary write buffer is invalidated in response to determining that a MEMC-originated memory write response is received for the memory write request for metadata update.

In an embodiment, the method is performed by a non-host device attached with the device memory; the host device and the non-host device communicate with memory access protocols to allow the host device to perform memory access transactions to access data and metadata stored in the device memory.

In an embodiment, the memory access protocols represent Compute Express Link memory access (CXL .mem) protocols; the non-host device attached with the device memory represents a CXL Type 3 device.

In an embodiment, a memory write request arbiter in the non-host device is used to process host-originated memory write requests received from the host device and metadata update memory write requests generated by the non-host device; the metadata update memory write requests are assigned higher priorities than the host-originated memory write requests.

In an embodiment, a computing device such as a server, one or more computing processors or chips or chipsets on a server board, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
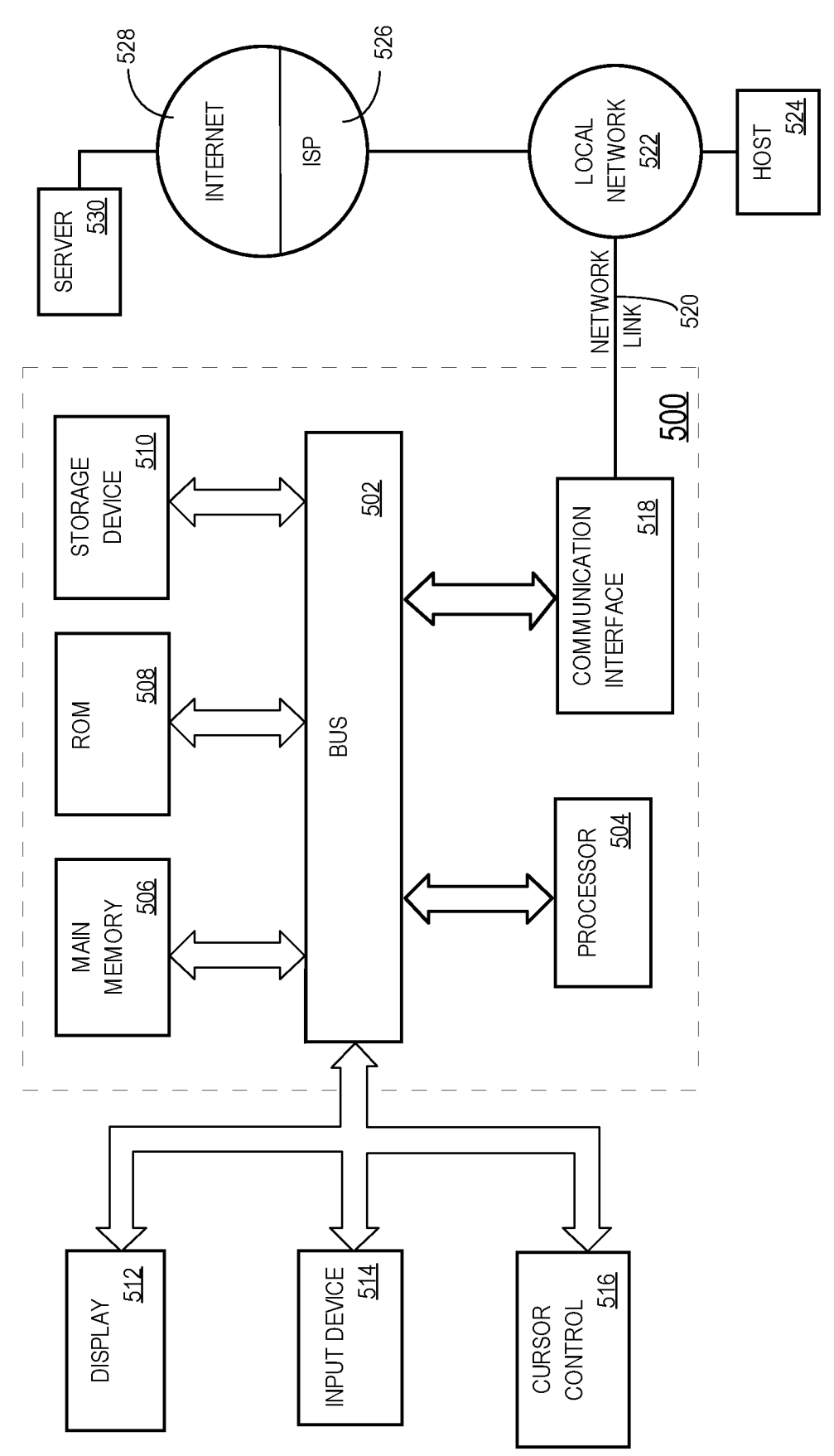
FIG. 5 is block diagram of a computer system upon which embodiments of the inventive subject matter may be implemented.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 is a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor

504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 515 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, by a non-host device separate from and in between a host device and a device memory, a memory read response from a memory controller (MEMC) of the device memory in response to a memory request previously sent to the memory controller, the memory read response from the memory controller including specific data and specific metadata attendant to the specific data retrieved with one or more specific memory addresses in the device memory;
   sending, by the non-host device to the host device, the specific data and specific metadata in a host-bound memory read response derived from the memory read response received from the memory controller;
   in response to determining, by the non-host device, that a metadata update condition is satisfied, performing by the non-host device:
   determining specific modified metadata attendant to the specific data;
   generating a MEMC-bound memory write request for metadata update to be sent to the MEMC of the device memory, the MEMC-bound memory write request being used to write the specific modified metadata attendant to the specific data in the device memory;
   storing the specific data and the specific modified metadata in an entry of a temporary write buffer at the non-host device until the entry is invalidated.

2. The method of claim 1, wherein the memory read request previously sent to the memory controller corresponds to a first host-originated memory read request received at a first time point from the host device; wherein a second host-originated memory read request is received at a second time point later than the first time point from the host device; wherein the specific data and the specific modified metadata are sent to the host device in a second host-bound memory read response derived from a hit result in the temporary write buffer.

3. The method of claim 1, wherein at least one metadata update condition is satisfied in connection with the second host-originated memory read request; wherein a second memory write request is generated to write second specific modified metadata attendant to the specific data in the device memory; wherein the second specific modified metadata is stored in a second entry of the temporary write buffer until the second entry is invalidated.

4. The method of claim 1, where the entry of the temporary write buffer is invalidated in response to determining that a MEMC-originated memory write response is received for the memory write request for metadata update.

5. The method of claim 1, wherein the method is performed by a non-host device attached with the device memory; wherein the host device and the non-host device communicate with memory access protocols to allow the host device to perform memory access transactions to access data and metadata stored in the device memory.

6. The method of claim 5, wherein the memory access protocols represent Compute Express Link memory access (CXL .mem) protocols; wherein the non-host device attached with the device memory represents a CXL Type 3 device.

7. The method of claim 1, wherein the method is performed by the non-host device; wherein a memory write request arbiter in the non-host device is used to process host-originated memory write requests received from the host device and metadata update memory write requests generated by the non-host device; wherein the metadata update memory write requests are assigned higher priorities than the host-originated memory write requests.

8. A computing device comprising:

one or more computing processors;

one or more non-transitory computer readable storage media, comprising instructions, which when executed by one or more computing processors cause the one or more computing processors to perform:

receiving, by a non-host device separate from and in between a host device and a device memory, a memory read response from a memory controller (MEMC) of the device memory in response to a memory request previously sent to the memory controller, the memory read response from the memory controller including specific data and specific metadata attendant to the specific data retrieved with one or more specific memory addresses in the device memory;

sending, by the non-host device to the host device, the specific data and specific metadata in a host-bound memory read response derived from the memory read response received from the memory controller;

in response to determining, by the non-host device, that a metadata update condition is satisfied, performing by the non-host device:

determining specific modified metadata attendant to the specific data;

generating a MEMC-bound memory write request for metadata update to be sent to the MEMC of the device memory, the MEMC-bound memory write request being used to write the specific modified metadata attendant to the specific data in the device memory;

storing the specific data and the specific modified metadata in an entry of a temporary write buffer at the non-host device until the entry is invalidated.

9. The computing device of claim 8, wherein the memory read request previously sent to the memory controller corresponds to a first host-originated memory read request received at a first time point from the host device; wherein a second host-originated memory read request is received at a second time point later than the first time point from the host device; wherein the specific data and the specific modified metadata are sent to the host device in a second host-bound memory read response derived from a hit result in the temporary write buffer.

10. The computing device of claim 8, wherein at least one metadata update condition is satisfied in connection with the second host-originated memory read request; wherein a second memory write request is generated to write second specific modified metadata attendant to the specific data in the device memory; wherein the second specific modified metadata is stored in a second entry of the temporary write buffer until the second entry is invalidated.

11. The computing device of claim 8, where the entry of the temporary write buffer is invalidated in response to determining that a MEMC-originated memory write response is received for the memory write request for metadata update.

12. The computing device of claim 8, wherein the method is performed by a non-host device attached with the device memory; wherein the host device and the non-host device communicate with memory access protocols to allow the host device to perform memory access transactions to access data and metadata stored in the device memory.

13. The computing device of claim 12, wherein the memory access protocols represent Compute Express Link memory access (CXL .mem) protocols; wherein the non-host device attached with the device memory represents a CXL Type 3 device.

14. The computing device of claim 8, wherein the method is performed by the non-host device; wherein a memory write request arbiter in the non-host device is used to process host-originated memory write requests received from the host device and metadata update memory write requests generated by the non-host device; wherein the metadata update memory write requests are assigned higher priorities than the host-originated memory write requests.

15. One or more non-transitory computer readable storage media, comprising instructions, which when executed by one or more computing processors cause the one or more computing processors to perform:

receiving, by a non-host device separate from and in between a host device and a device memory, a memory read response from a memory controller (MEMC) of the device memory in response to a memory request previously sent to the memory controller, the memory read response from the memory controller including specific data and specific metadata attendant to the specific data retrieved with one or more specific memory addresses in the device memory;

sending, by the non-host device to the host device, the specific data and specific metadata in a host-bound memory read response derived from the memory read response received from the memory controller;

in response to determining, by the non-host device, that a metadata update condition is satisfied, performing by the non-host device:

determining specific modified metadata attendant to the specific data;

generating a MEMC-bound memory write request for metadata update to be sent to the MEMC of the device memory, the MEMC-bound memory write request being used to write the specific modified metadata attendant to the specific data in the device memory;

storing the specific data and the specific modified metadata in an entry of a temporary write buffer at the non-host device until the entry is invalidated.

16. The media of claim 15, wherein the memory read request previously sent to the memory controller corresponds to a first host-originated memory read request received at a first time point from the host device; wherein a second host-originated memory read request is received at a second time point later than the first time point from the host device; wherein the specific data and the specific modified metadata are sent to the host device in a second host-bound memory read response derived from a hit result in the temporary write buffer.

17. The media of claim 15, wherein at least one metadata update condition is satisfied in connection with the second host-originated memory read request; wherein a second memory write request is generated to write second specific modified metadata attendant to the specific data in the device memory; wherein the second specific modified metadata is stored in a second entry of the temporary write buffer until the second entry is invalidated.

18. The media of claim 15, where the entry of the temporary write buffer is invalidated in response to determining that a MEMC-originated memory write response is received for the memory write request for metadata update.

19. The media of claim 15, wherein the method is performed by a non-host device attached with the device memory; wherein the host device and the non-host device communicate with memory access protocols to allow the host device to perform memory access transactions to access data and metadata stored in the device memory.

20. The media of claim 19, wherein the memory access protocols represent Compute Express Link memory access (CXL .mem) protocols; wherein the non-host device attached with the device memory represents a CXL Type 3 device.

21. The media of claim 15, wherein the method is performed by the non-host device; wherein a memory write request arbiter in the non-host device is used to process host-originated memory write requests received from the host device and metadata update memory write requests generated by the non-host device; wherein the metadata update memory write requests are assigned higher priorities than the host-originated memory write requests.

* * * * *